US012558744B2

(12) United States Patent (10) Patent No.: US 12,558,744 B2
Casado et al. (45) Date of Patent: Feb. 24, 2026

(54) PROCESS FOR THE PRODUCTION OF CRUDE SOLDER

(71) Applicant: METALLO BELGIUM, Beerse (BE)

(72) Inventors: Valentin Casado, Berango (ES); Luis Martinez, Berango (ES); Bert Coletti, Achel (BE); Jan Dirk A. Goris, Beerse (BE); Yves De Visscher, Wechelderzande (BE); Charles Geenen, Overpelt (BE)

(73) Assignee: METALLO BELGIUM, Beerse (BE)

( * ) Notice: Subject to any disclaimer, the term of this patent is extended or adjusted under 35 U.S.C. 154(b) by 866 days.

(21) Appl. No.: 17/715,339

(22) Filed: Apr. 7, 2022

(65) Prior Publication Data

US 2022/0226939 A1 Jul. 21, 2022

Related U.S. Application Data

(62) Division of application No. 16/491,952, filed as application No. PCT/EP2018/059117 on Apr. 10, 2018, now Pat. No. 12,202,076.

(30) Foreign Application Priority Data

Apr. 10, 2017 (EP) .................................... 17165797

(51) Int. Cl.
*B23K 35/26* (2006.01)
*B23K 35/362* (2006.01)
*B23K 103/08* (2006.01)

(52) U.S. Cl.
CPC .......... *B23K 35/262* (2013.01); *B23K 35/362* (2013.01); *B23K 2103/08* (2018.08)

(58) Field of Classification Search
CPC .................................................... B23K 35/262
See application file for complete search history.

(56) References Cited

U.S. PATENT DOCUMENTS

| | | | |
|---|---|---|---|
| 2,329,817 A | 9/1943 | Betterton et al. | |
| 3,744,121 A | 7/1973 | Nagano et al. | |
| 4,017,308 A | 4/1977 | Peterson et al. | |
| 4,508,565 A | 4/1985 | Leirnes et al. | |
| 11,839,938 B2 | 12/2023 | Govaerts et al. | |

FOREIGN PATENT DOCUMENTS

| | | |
|---|---|---|
| CN | 101570826 A | 11/2009 |
| CN | 101696475 A | 4/2010 |
| CN | 102352443 A | 2/2012 |
| CN | 102534249 A | 7/2012 |
| CN | 104141152 A | 11/2014 |
| CN | 104593614 A | 5/2015 |
| CN | 104651626 A | 5/2015 |
| EP | 0 185 004 A1 | 6/1986 |
| GB | 224923 A | 11/1924 |
| WO | 2017012156 | 1/2017 |

OTHER PUBLICATIONS

Bauccio, Michael. (1993). ASM Metals Reference Book (3rd Edition). ASM International. pp. 485-491. Retrieved from https ://app. knovel .com/hotlink/toc/id :kpAS MM RB E 1 /asm-metals-reference/ asm-metals-reference (Year: 1993).
International Search Report mailed Jun. 1, 2018, issued in corresponding International Application No. PCT/EP2018/059117, filed Apr. 10, 2018, 4 pages.
Written Opinion of the International Searching Authority mailed Jun. 1, 2018, issued in corresponding International Application No. PCT/EP2018/059117, filed Apr. 10, 2018, 7 pages.
European Search Report mailed Jul. 3, 2017, issued in corresponding Application No. 17165797.6, filed Apr. 10, 2017, 8 pages.
International Preliminary Report on Patentability mailed Oct. 15, 2019, issued in corresponding International Application No. PCT/ EP2018/059117, filed Apr. 10, 2018, 1 page.
Yang Bin et al: "Recycling of metals from waste Sn-based alloys by vacuum separation," Transactions of Nonferrous Metals Society of China: English Edition = Zhongguo-Youse-Jinshu-Xuebao, Elsevier, vol. 25, No. 4, May 6, 2015, pp. 1315-1324, XP029591108, ISSN: 1003-6326;10 pages total.

*Primary Examiner* — Jophy S. Koshy
(74) *Attorney, Agent, or Firm* — CHRISTENSEN O'CONNOR JOHNSON KINDNESS PLLC

(57) ABSTRACT

Disclosed is a pyrometallurgical process for producing a crude solder comprising at least 9.5-69% wt of tin and at least 25% wt lead, at least 80% tin and lead together, 0.08-12% wt of copper, 0.15-7% wt of antimony, 0.012-1.5% wt of bismuth, 0.010-1.1% wt of zinc, at most 3% wt of arsenic, at most 2.8% wt of nickel, at most 0.7% wt of zinc, at most 7.5% wt of iron and at most 0.5% wt of aluminium, from a feedstock selected in terms of its levels of Sn, Cu, Sb, Bi, Zn, As, Ni and Pb, the process comprising at least the steps of obtaining in a furnace a liquid bath of metal and slag, introducing a reducing agent and optionally also energy, separating the crude solder from the slag and removing liquid from the furnace. The crude solder may readily be further prepared to become suitable as feedstock for vacuum distillation.

66 Claims, 1 Drawing Sheet

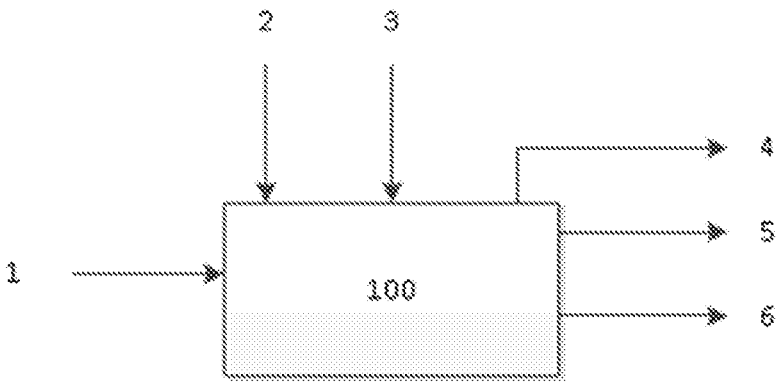

PROCESS FOR THE PRODUCTION OF CRUDE SOLDER

CROSS REFERENCE TO RELATED PATENT APPLICATIONS

This patent application is a divisional of U.S. patent application Ser. No. 16/491,952, filed Sep. 6, 2019, which is a National Stage of International Application No. PCT/US2018/059117, filed Apr. 10, 2018, which claims the benefit of European Patent Application No 17165797.6, filed Apr. 10, 2017, the entire disclosures of which are hereby incorporated by reference herein in for all purposes.

FIELD OF THE INVENTION

The present invention relates to the production of non-ferrous metals, in particular tin (Sn) and lead (Pb), possibly in combination with the production of copper (Cu), by pyrometallurgy. More particularly, the invention relates to an improved process for the production of a crude solder, a metal mixture comprising primarily tin and lead, which is particularly suitable for the production of high purity tin and/or lead prime products. The present invention further relates to the crude solder itself and the use thereof in the production of an improved solder composition.

BACKGROUND OF THE INVENTION

The materials available as feedstock for the production of non-ferrous metals typically contain a plurality of metals. Because of the high purity requirements for the non-ferrous metals when these are used in most of their high volume applications, the different metals need to be separated from each other in the production process. The non-ferrous metal production processes typically contain at least one and usually a plurality of pyrometallurgical process steps in which metals and metal oxides both occur in a liquid molten state, and wherein the metal oxides may be separated by gravity as a separate and typically lighter liquid slag from the usually heavier molten metal phase. The slag is usually withdrawn as a separate stream from the process, and this separation may lead to the production of a slag as the coproduct from the metal production.

The non-ferrous metals may be produced from fresh ore as the starting material, also called primary sources, or from recyclable materials, also known as secondary feedstocks, or from a combination thereof. Recyclable materials may for instance be by-products, waste materials and end-of-life materials. The recovery of non-ferrous metals from secondary feedstocks has become an activity of paramount importance over the years. The recycling of non-ferrous metals after use has become a key contributor in the industry, because of the continuing strong demand for such metals and the reducing availability of high quality fresh metal ores. Many of these secondary feedstocks are available in a finely divided form, for which the possible end-uses are rather limited. The processing of secondary feedstocks typically involves the use of pyrometallurgical process steps which generate a slag as coproduct.

When producing copper concentrates by pyrometallurgy, any tin and/or lead present has the tendency to become more readily oxidized than copper, and the oxides thereof then readily move into the supernatant slag. This slag may be separated from the copper-rich molten metal. By a subsequent chemical reduction step, the tin and/or lead in the slag may then be returned into their metal state, and these metals may then be separated from the remaining slag as a molten metal mixture which is rich in tin and/or lead, typically containing significant amounts of both. These metal streams typically have a lower melting point than the copper-containing coproducts and are often called "solder". Besides the tin and lead, these crude solders may contain significant but minor amounts of other metals, such as copper (Cu), antimony (Sb), arsenic (As), bismuth (Bi), iron (Fe), indium (In), nickel (Ni), zinc (Zn), aluminium (Al), germanium (Ge), tellurium (Te), cobalt (Co), manganese (Mn), selenium (Se), silicon (Si), thallium (Tl), gallium (Ga), and sometimes also precious metals, albeit usually in much smaller amounts, such as silver (Ag), gold (Au), platinum (Pt), palladium (Pd), ruthenium (Ru), rhodium (Rh), osmium (Os), and iridium (Ir). The crude solder may also contain elements which are not considered as metals, such as sulphur (S), carbon (C) and oxygen (O).

The crude solders may have direct commercial uses, depending on their composition, but they are also known as an intermediate for the recovery of some of their individual components in a higher purity form, suitable for producing concentrated metal products that are acceptable for upgrade into their more demanding end-uses. A high interest remains primarily in recovering higher purity tin (Sn) from such solder streams, and also in recovering lead (Pb) in some higher purity forms.

U.S. Pat. No. 4,508,565 discloses a method for producing lead having a sulphur content of 1.0% wt from pellets formed from oxidic-sulphatic lead raw materials originating from copper-converter dust. The raw material contained 40% wt of lead, 12% wt of zinc, 3.5% wt of arsenic, 1.15% wt of copper, 8.0% wt of sulphur, 0.5% wt of bismuth and 0.6% wt of tin. About half of the pellets were charged into a top-blown rotary converter of the Kaldo-type, together with finely-divided limestone, granulated fayalite slag obtained from copper manufacturing process and coke in particle sizes of between 5 and 12 mm. This first furnace charge was heated with the aid of an oil-oxygen burner to a doughy consistency, upon which the second half of the pellets, further amounts of limestone, fayalite slag and coke were added, and heating was continued. From the converter were tapped (i) a slag at 1120° C. containing 16.5% Zn, 18% Fe, 1.4% Pb, 1.4% As, 1.5% Sn, 20% $SiO_2$, 21% CaO and 1.5% MgO, as well as (ii) the raw lead product containing 1.0% sulphur. U.S. Pat. No. 4,508,565 is not concerned with the production of a solder or with the recovery of high purity metal streams therefrom.

A known technique for obtaining higher purity metal streams starting from solder, is by vacuum distillation, a technique which is typically performed under very low pressures in combination with relatively high temperatures. By means of vacuum distillation, lead may be separated by evaporation from other less volatile metals, such as tin. Vacuum distillation may serve to separate a solder stream into a higher purity lead stream as overhead product, and a higher purity tin stream as leftover bottom product. The vacuum distillation of solder-type metal mixtures may be performed batch-wise or in continuous mode. However, the inventors have found that the distillation of solder-type metals may be suffering from operational problems. Over time, even at high temperatures, insoluble solids may form by the crystallization of intermetallic compounds containing copper, nickel, iron and/or zinc. These insoluble solids may adhere to the distillation equipment, particularly in sensitive areas such as small openings, thereby impairing smooth operations and even blocking the equipment.

The inventors have found that particular metals are capable, under vacuum distillation conditions, of forming mutual intermetallic compounds between at least two of these particular metals and/or intermetallic compounds of at least one of the particular metals with tin. The inventors have further found that many of these intermetallic compounds have a much higher melting point than the temperature of the mixture in which they are formed. The inventors have therefore found that these high melting point intermetallic compounds may come out of solution and form solids. These solids may remain suspended in the liquid metal and risk to reduce the fluidity of the mixture, such as by raising the viscosity of the liquid mixture. This already by itself may hinder a smooth operation of the distillation equipment, such as by slowing down the flow of liquid metals, which reduces the equipment capacity and thus force the equipment to be operated at reduced throughput. The solids may also adhere and/or attach to the distillation equipment, and thereby create a risk for impairing or even obstructing the operation of the distillation equipment, e.g. by clogging up important passages for the process streams. The described phenomenon may even lead to unplanned process shutdowns to open the distillation apparatus and either clean or replace the affected equipment items.

The inventors have found that in particular chromium (Cr), manganese (Mn), vanadium (V), titanium (Ti), tungsten (W), copper (Cu), nickel (Ni), iron (Fe), zinc (Zn) and aluminium (Al), are metals of which the presence in a solder stream which is fed to a vacuum distillation step may lead to the disturbing intermetallic compounds. Cu, Ni, Fe, Zn and Al are rather typically present in solder streams from non-ferrous metal production, usually because of their presence in the starting materials. Fe and Al may also be introduced as part of process steps upstream of the solder production.

The inventors have found that the identified problems may significantly be alleviated and even may be avoided by controlling within particular limits the concentration of these metals in the crude solder.

For removing these metals, the crude solder is conventionally pre-treated, upstream of the vacuum distillation, using a fairly complex so-called "cupro process" or "silicon process", more correctly the "cuprosilicon process", in which elemental silicon, often also called "silicon metal", is introduced in a suitable form to react some of the metals (such as copper, nickel and iron) selectively away from the lead and tin, to form metal-silicon (silicide) alloys or intermetallic compounds. Two immiscible metal phases are then formed whereby the silicides are retrieved in the top layer, also called the "cupro" layer or material. When the reaction is completed, the temperature is lowered and the "cupro" layer on top of the solder metal phase solidifies first because it has the highest melting temperature. This "cupro" layer may then be removed from the still molten solder metal phase upon which it floats, for example by tapping the solder away from underneath the solidified cupro layer. After being subjected to the silicon process and cooling, the solder contains less copper, nickel, and/or iron and is therefore more suitable for obtaining higher purity metal streams by vacuum distillation. U.S. Pat. No. 2,329,817 discloses such a process in which 36 parts by weight of silicon metal was added to 600 parts of a molten impure "white metal", containing 5.27% Ni, covered with 48 parts of a sodium silicate slag. After the reaction, 74.0 parts by weight of a silicide layer was formed containing 42.5% wt Ni and only minor amounts of Sn, Pb, As and Sb. The remaining 552 parts by weight of metal mixture contained only 0.13% wt of nickel. However, such a process requires and consumes rather scarce and hence expensive raw materials containing silicon metal, which ultimately, after recycling of the silicide formed in the silicon process, end up as oxides in a low value by-product such as slag. This downgrade of high value silicon metal to the much lower slag value represents a significant economic burden.

Technically, aluminium could also be used in the cuprosilicon process, instead of—or together with—silicon. The contaminant metals would then form aluminides, and these would also separate into the cupro layer and may thus be removed. This is however not done in practice. Aluminium brings the problem that with antimony and arsenic, under the conditions of the cuprosilicon process, it forms aluminium antimonide and aluminium arsenide. These intermetallic compounds, upon cooling, readily react with water, even under standard, normal and/or ambient conditions, whereby the moisture in the ambient air is sufficient, to form the highly toxic gasses stibine ($SbH_3$) or arsine ($AsH_3$), gasses which are lethal at very low concentrations in air. Because it is practically not possible to avoid these safety risks, the use of aluminium in the cuprosilicon process is not an option and hence excluded.

GB 224923 discloses a treatment of a concentrate of Cornish tin ore to produce a lead/tin alloy, hence a solder-type of product. The tin ore concentrate contained at least 15% of tin, further contained arsenical pyrites, and was having a siliceous gangue as the non-valuable part of the concentrate. The tin ore concentrate was first roasted to eliminate the arsenic and to convert at least a part of the iron sulphide in the pyrite into iron oxide. The roasted tin concentrate was mixed with a lead concentrate and the mixture was smelted in a reverberatory furnace in a reducing atmosphere. A considerable excess of lead over the tin was present, and the proportion of lead to tin in the charge was preferably from 6 to 8 of lead to 1 of tin. Additional oxide of iron or other flux may have been added to make a proper slag. Metallic iron, preferably tin plate scrap, was added for the reduction of the sulphide of lead and tin into the respective metals. The temperature of the charge was gradually increased, but was not be allowed to rise as high as that at which silicates are formed, until the tin oxide was converted into tin sulphide. When this conversion had happened, the temperature was raised further to form a slag and to complete the reduction of the sulphides of lead and tin. The charge was then skimmed and tapped. A tin-lead alloy was found at the bottom of the bath and this product was considered suitable to be used for the production of various alloys of tin and lead, or subjected to any known process for separating more or less completely the two metals. GB 224923 is silent about metals other than lead and tin that may have been present in the alloy product, such as excess iron, nor how any lead and/or tin might be separated downstream from the solder-type product, in which the lead to tin ratio was from 6:1 to 8:1.

Therefore, there remains a need for a simple and cost effective process to produce a crude type of solder stream, preferably from secondary feedstocks which are possibly (partially) finely divided, whereby the crude solder is sufficiently rich in tin and lead, and sufficiently lean in copper, nickel, iron and zinc, such that the composition is, after only relatively simple chemical tuning steps, suitable for trouble-free vacuum distillation to separate lead from tin, more particularly without the risk for the formation in the distillation equipment of intermetallic compounds caused by the presence of disturbing amounts of copper, nickel, iron and zinc, and this without requiring the cuprosilicon process step as an essential extra processing step for conditioning the crude solder to a quality that does not lead to the formation of intermetallic compounds during downstream vacuum distillation.

A conventional apparatus for producing copper concentrate from copper containing secondary feedstocks, whereby crude solder is formed as a by-product, is a top-blown rotary convertor (TBRC), also called a Kaldo-type furnace. This is a furnace equipped for rotating around a longitudinal axis but is also equipped for tilting around a second horizontal axis perpendicular to that longitudinal axis. However, a TBRC is a complex and expensive apparatus. Furthermore, if part of the feedstock is finely divided, a major part of this fine portion may readily be blown out of the TBRC by the flue gasses that are typically generated inside, before they have a chance to become incorporated into the liquid bath inside the furnace. This feedstock portion becomes lost for the process and additionally may create a significant waste disposal problem. There are alternatives to the TBRC, such as the so-called "Isasmelt" or the "Ausmelt" apparatuses for producing copper concentrate prime product from secondary feedstocks, but these are equally complex apparatuses.

A further need therefore exists to simplify the solder production process such that it may be performed in a much less complex processing equipment, which preferably is also able to accept finely divided feedstocks without causing operational or waste disposal problems.

The present invention aims to obviate or at least mitigate the above described problem and/or to provide improvements generally.

SUMMARY OF THE INVENTION

According to the invention, there is provided a process for producing a crude solder, a crude solder obtainable from the process, and the use of that crude solder, as defined in any of the accompanying claims.

In an embodiment, the invention provides a process for producing a crude solder comprising lead (Pb) and tin (Sn) from a feedstock which comprises at least 50% wt of total metal, expressed relative to the total dry weight of the feedstock, wherein the total feedstock comprises the following metals, the amounts of each metal being expressed as the total of the metal present in the feedstock in any oxidized state and in the reduced metal form, and relative to the total dry weight of the feedstock:

at least 2% wt and at most 71% wt of tin (Sn),
at least 1.00% wt and at most 10% wt of copper (Cu),
at least 0.02% wt and at most 5% wt of antimony (Sb),
at least 0.0004% wt and at most 1% wt of bismuth (Bi),
at most 37% wt of zinc (Zn),
at most 1% wt of arsenic (As), and
at most 2% wt of nickel (Ni), wherein the total feedstock further comprises lead (Pb) and is characterized by a Pb/Sn weight ratio of at least 0.5 and at most 4.0,
and wherein at least one of tin (Sn) and lead (Pb) is at least partially present in an oxidized valence form,
the process comprising the following steps:

a) obtaining a liquid bath comprising a molten metal and/or a molten metal oxide slag in a furnace by introducing at least a portion of the feedstock into the furnace and melting the added feedstock portion;

b) introducing at least one reducing agent into the furnace and reducing at least a part of the oxidized valence form of tin and/or lead into tin and/or lead metal;

c) optionally introducing into the furnace at least one energy source comprising a combustible material and/or at least one metal which is less noble than Sn and Pb, and oxidizing the combustible material and/or the at least one metal in the energy source by the injection of air and/or oxygen into the furnace;

d) separating the crude solder obtained in step b) and/or c) from the slag and removing from the furnace at least a portion of the crude solder and/or of the slag.

In an embodiment the invention provides a crude solder obtainable by the process according to the present invention, comprising, in addition to unavoidable impurities and relative to the total weight of the crude solder:

at least 9.5% wt and at most 69% wt of tin (Sn),
at least 25% wt of lead (Pb),
at least 80% wt of tin (Sn) and lead (Pb) together,
at least 0.08% wt and at most 12% wt of copper (Cu),
at least 0.15% wt and at most 7% wt of antimony (Sb),
at least 0.012% wt and at most 1.5% wt of bismuth (Bi),
at least 0.010% wt and at most 1.1% wt of sulphur (S),
at most 3% wt of arsenic (As),
at most 2.8% wt of nickel (Ni),
at most 0.7% wt of zinc (Zn),
at most 7.5% wt of iron (Fe), and
at most 0.5% wt of aluminium (Al).

In an embodiment, the process according to the present invention is for producing the crude solder according to the present invention.

The solder composition as specified occurs either as a molten liquid phase at a temperature above 300° C., or as a solid alloy at lower temperatures. The solid alloy may exceptionally be granulated or powdered into a particulate material form, in which form it may attract moisture. For sake of accuracy, the concentrations as specified are in such context intended to represent values based on the total dry weight of the composition.

The inventors have found that the selection of the process feedstock, in accordance with how this is prescribed as part of the present invention, allows the process according to the present invention to produce a crude solder which may readily be further purified or "tuned" by simple process steps into a quality that is suitable for a trouble-free downstream vacuum distillation for the evaporation of lead from tin in the solder. The inventors have found that the crude solder obtainable from the process according to the present invention contains the potentially disturbing metals in such concentrations that the complex and expensive "cupro" process step, i.e. a step in which silicon is added in an oxidisable form to form silicides, which silicides may be separated from the solder upon cooling, thereby removing a portion of the potentially disturbing metals, may be eliminated and skipped from the steps preparing the crude solder as feedstock for the vacuum distillation.

The inventors have found that a proper selection of the feedstock of the process according to the present invention allows the production of a crude solder which contains amounts of the metals of concern that may be further reduced without needing the scarce and expensive raw metals silicon and/or aluminium. In other words, the crude solder produced by the process according to the present invention may be further conditioned to become suitable as feedstock for vacuum distillation by chemical treatment steps other than a treatment with silicon and/or aluminium metal to form silicides and/or aluminides and the selective solidification and removal of these silicides and/or aluminides.

The metals of concern are the metals that may form intermetallic compounds under vacuum distillation conditions, either with itself, each other, or with tin. The list of metals of concern particularly includes chromium (Cr), manganese (Mn), vanadium (V), titanium (Ti), tungsten (W), copper (Cu), nickel (Ni), iron (Fe), zinc (Zn) and aluminium (Al). Several of these metals do not need to be considered because they are typically very scarce in the raw materials for the production of the major non-ferrous metals that contain lead and/or tin. The crude solder and the raw materials of the process according to the present invention typically contain at most 0.10% wt of Cr, Mn, V, Ti or W, preferably at most 0.05% wt, more preferably at most 0.010% wt, even more preferably at most 0.005% wt, preferably at most 0.0010% wt, more preferably at most 0.0005% wt, even more preferably at most 0.0001% wt of any one of Cr, Mn, V, Ti or W, relative to the total dry weight of the composition. The present invention is therefore primarily concerned with the levels of Cu, Ni, Fe, Zn and Al, because these metals may be rather typically present in solder streams from non-ferrous metal production, usually because of their presence in the starting materials. Fe and Al may also be introduced as part of process steps upstream of the solder production.

The applicants have found that the crude solder obtainable by the process according to the present invention may be properly conditioned or tuned to become a suitable feedstock for vacuum distillation using the treatment steps described in our co-pending patent application EP-A-16190907.2, which was first filed on 27 Sep. 2016.

The inventors have further found that the possibly harmful metals, and in particular copper, do not need to be removed entirely from the crude solder in order to make this stream suitable, after further tuning or treatment as mentioned above, for vacuum distillation. The inventors have for instance found that the identified problems may be reduced to a practically and economically acceptable level when small amounts of copper remain present in the tuned solder that is fed to the distillation step. This finding brings the advantage that solder streams may be processed which occur as the by-product from the recovery of copper from primary and/or secondary feedstocks, in particular from secondary feedstocks, even more importantly from feedstocks containing end-of-life materials.

The inventors have found that the presence of some sulphur in the crude solder is advantageous. The sulphur readily helps in the downstream steps where Cu is removed from the crude solder, as part of the further tuning upstream of the vacuum distillation step. With S within the prescribed limits, the applicants have found that the downstream "tuning" of the crude solder is facilitated, and improved by reducing the amount of chemicals that need to be used.

The inventors have found that more valuable tin may be recovered in the crude solder when the lead/tin ratio of the feedstock is least 0.5 and at most 4.0. The inventors have found, when the feedstock comprises more lead, that the relative amount of tin in the crude solder relative to the amount of tin in the feedstock, is also higher. The inventors have found, by offering more lead together with the tin, that the recovery of tin from the feedstock is improved, and less of the available tin is ending up in the slag. The amount of recovered tin is typically the largest value contributor to the processing of the crude solder. The recovery of tin is therefore an important process parameter and is advantageously as high as economically and practically justified.

We have found that the crude solder produced by the process according to the present invention, after tuning, may readily be subjected to a vacuum distillation step without the problem of the formation of intermetallic compounds during the vacuum distillation.

The inventors have further found that the process according to the present invention may readily be carried out in a smelter furnace. A smelter furnace is a fairly simple and cheap apparatus consisting of a large cylinder-shaped furnace which only needs to be able to tilt around its longitudinal axis over a part of a full circle. This finding brings the advantage that the crude solder may be produced by the process according to the present invention, for instance as temporary production campaigns, in the same smelter apparatus which may also be producing in other campaigns a copper metal phase of at least 70% wt and typically 75% wt of Cu, also known as "black copper" and/or in a smelter apparatus which also recovers even higher purity copper from such copper concentrate. Optionally there may be provided a simple washing step in between the campaigns, as further detailed below.

The inventors have also found that the process according to the present invention is able to accept finely divided feedstocks without any operational problems.

The applicants have further found that the reducing agent in step b) and/or step k) may already be introduced together with the feedstock portion added as part of step a) and/or step j).

The applicants have also found that, if extra energy needs to be supplied as part of step c) and/or step l), that this may optionally be performed together with the introduction of the reducing agent of step b) and/or step k), and thus possibly also together with the introduction of the feedstock portion of step a) and/or step j).

The applicants have thus found that step b) and step c), as well as step k) and step l), may be combined, and thus that the reducing agent of step b) and/or k) and the energy source of respectively step c) and/or step l) may be introduced together. This combination of steps may be performed separate from respectively step a) and/or j), or may be combined with respectively step a) or step j).

The applicants submit that the options offered for steps a)-d) above also apply to the corresponding steps j)-m) which are introduced further below in this document.

The applicants have found that particular materials may act both as a reducing agent and as an energy source comprising at least one metal which is less noble than Sn and Pb. A very suitable example of such material is ferrosilicon (FeSi), a material in which both elemental iron and elemental silicon are present. Iron and silicon are both less noble than Sn and Pb. The elemental iron is able to act as a reducing agent, able to convert $SnO_2$ and/or PbO into respectively Sn and Pb metal, while the iron converts to FeO and/or $Fe_2O_3$, which oxide moves into the slag phase. The elemental silicon is able to convert $SnO_2$ and/or PbO into Sn and/or Pb, while the silicon itself converts into $SiO_2$, which also moves into the slag phase.

BRIEF DESCRIPTION OF THE DRAWINGS

The FIGURE shows a flow diagram of an embodiment of the process according to an embodiment of the present invention.

DETAILED DESCRIPTION

The present invention will be described in the following with respect to particular embodiments and with reference to certain drawings but the invention is not limited thereto but only by the claims. Any drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

As used herein and in the claims, the terms "comprising" and "including" are inclusive or open-ended and do not exclude the presence of additional unrecited elements, compositional components, process or method steps. Accordingly, the terms "comprising" and "including" encompass the more restrictive terms "consisting essentially of" and "consisting of."

Unless specified otherwise, all values provided herein include up to and including the endpoints given, and the values of the constituents or components of the compositions are expressed in weight percent or % by weight of each ingredient in the composition.

Additionally, each compound used herein may be discussed interchangeably with respect to its chemical formula, chemical name, abbreviation, etc.

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bounded form, typically in an oxidized form (oxidation state>0). For the metals which may relatively easily be reduced to their elemental forms, and which may occur as molten metal in the pyrometallurgical process, it is fairly common to express their presence in terms of their elemental metal form, even when the composition of a slag or dross is given, wherein the majority of such metals may actually be present in an oxidized and/or chemically bounded form. It is therefore that the feedstock according to the process according to the present invention and the crude solder according to the present invention specify the content of Fe, Sn, Zn, Pb, Cu, Sb, Bi, As, Ni as elemental metals. Less noble metals are more difficult to reduce under non-ferrous pyrometallurgical conditions and occur mostly in an oxidized form. These metals typically are expressed in terms of their most common oxide form. Therefore, where necessary, the content of Si, Ca, Al, Na are respectively expressed as $SiO_2$, $CaO$, $Al_2O_3$, $Na_2O$.

Within the context of the present invention, the expression "less noble metals than metal X" means the metals that are more prone to undergo oxidation under the conditions and in the particular environment of the context wherein the expression is used and this to the benefit of being able to obtain a reduction of the metal X. For example, the expression "metals less noble than Sn and Pb" refers to metals which are, under the conditions and in the particular environment of the context wherein the expression is used, more prone to oxidation and able to obtain a reduction of Sn and Pb.

The metals of interest for this invention have, under the typical pyrometallurgical furnace conditions of non-ferrous metal processing, affinities for oxygen, and will tend to distribute between the metal and the slag phase. From lower to higher affinity for oxygen, and hence from a relatively high affinity to a lower affinity for the metal phase, the ranking of these metals may be represented roughly as follows: Au>Ag>>Bi/Cu>Ni>As>Sb>Pb>Sn>>Fe>Zn>Si>Al>Mg>Ca. For convenience, one may call this a ranking of the metals from the more noble to the less noble, but this qualification has to be linked to the particular conditions and circumstances of non-ferrous metal pyrometallurgical processes, and may fail when exported into other fields. The relative position of particular metals in this list may a.o. be affected by the presence or absence of other elements in the furnace, such as e.g. silicon.

The equilibrium distribution of metal between metal and slag phase may also be influenced by adding oxygen and/or oxygen scavenging materials (or reducing agents) into the liquid bath in the furnace.

Oxygen addition will convert some of the metals in the metal phase into their oxidised form, which oxide will then move into the slag phase. The metals in the metal phase which have a high affinity for oxygen will be more prone for undergoing this conversion and move. Their equilibrium distribution between metal and slag phase may thus be more subject to change.

The opposite may be obtained by adding oxygen scavenging materials. Suitable oxygen consumers may for instance be carbon and/or hydrogen, in whatever shape or form, such as in organic materials, e.g. plastics, including polyvinyl chloride (PVC), wood, or other combustibles, such as natural gas. Carbon and hydrogen will readily oxidize ("burn") and convert to $H_2O$ and/or $CO/CO_2$, components that readily leave the liquid bath and entrain its oxygen content from the bath. But also metals such as Si, Fe, Al, Zn and/or Ca are suitable reducing agents. Of particular interest are iron (Fe) and/or aluminium (Al), because of their ready availability. By oxidizing, these components will reduce some of the metals in the slag phase from their oxidized state into their metal state, and these metals will then move into the metal phase. Now it are the metals in the slag phase which have a lower affinity for oxygen that will be more prone for undergoing this reduction reaction and for making the move in the opposite direction.

In a smelter step, one of the purposes is to reduce oxides of valuable non-ferrous metals that are coming in with the feed into their corresponding reduced metals. The direction and speed of the reactions occurring in the smelter step may additionally be steered by controlling the nature of the atmosphere in the furnace. Alternatively or in addition, oxygen donating material or oxygen scavenging material may be added to the smelter.

A highly suitable oxygen scavenging material for such operations is iron metal, usually scrap iron being preferred. Under the typical operating conditions, the iron will react with hot oxides, silicates and the other compounds of metals having a lower affinity for oxygen than iron, to yield a melt containing the latter metals in elemental form. Typical reactions include:

$$MeO+Fe \rightarrow FeO+Me+heat$$

$$(MeO)_xSiO_2+x\ Fe \rightarrow (FeO)_xSiO_2+x\ Me+heat$$

The temperature of the bath remains high through the exothermic heat of reaction and the heat of combustion. The temperature may readily be kept within a range in which the slag remains liquid and volatilization of lead and/or tin remains limited.

Each of the reduction reactions taking place in the melting furnace is reversible. Thus, the conversion realized through each reaction is limited by the equilibria defined in relationships such as the following:

$$K1 = \frac{[FeO][Me]}{[MeO][Fe]}$$

$$K2 = \frac{[(FeO)_xSiO_2][Me]^x}{[(MeO)_xSiO_2][Fe]^x}$$

In the case where Me is copper, K1 and K2 are high at normal reaction temperatures and reduction of copper compounds thus proceeds substantially to completion. In the case of lead and tin, K1 and K2 are both relatively low, but the copper in the metal phase, if present in sufficient quantities, may extract metallic lead and tin from the slag reaction zone, thereby lowering the activities of these metals in the slag and driving the reduction of combined lead and tin to completion.

The vapour pressure of zinc is relatively high at the typical reaction temperature and a major proportion of zinc, in contrast to lead and tin, may readily be volatilized out of the furnace. Zinc vapours leaving the furnace are oxidized by air which may e.g. be aspirated between the furnace mouth and the hood and/or the exhaust pipe. The resultant zinc oxide dust is condensed and collected by means of conventional dust collecting systems.

In an embodiment of the process according to the present invention, the feedstock comprises, relative to the total dry weight of the feedstock, more than 50% wt of total metal, preferably at least 51% wt, more preferably at least 52% wt, even more preferably at least 53% wt, preferably at least 54% wt, more preferably at least 55% wt, even more preferably at least 56% wt, even more preferably at least 57% wt, preferably at least 58% wt, more preferably at least 59% wt, and yet more preferably at least 60% wt of total metal, preferably at least 65% wt, more preferably at least 70% wt, even more preferably at least 75% wt.

In an embodiment of the process according to the present invention, the feedstock further comprises substances or components selected from O and S atoms, e.g. when contained in oxides and/or sulphides, any of the halogens, carbon, and organic material.

The feedstock comprises a metallic part, i.e. the amount of total metal in % wt, and typically also a non-metallic part which represents the remainder of the feedstock. We have found that the remainder of the feedstock is preferably primarily selected from O and S atoms contained in oxides and/or sulphides, any halogens, carbon, and/or organic material. The applicants prefer, apart from the metals, that the feedstock primarily comprises O and S atoms, preferably when contained in oxides and/or sulphides, carbon, or organic material, such as most kind of plastics including PVC, because the process may readily be made capable of coping with these additional substances or components, e.g. by providing appropriate exhaust gas treatment facilities. More preferably, the feedstock contains, apart from the metals, oxygen, e.g. as part of oxides, carbon and/or organic material, because of the ease with which these may be handled by the process. Most preferably, the applicants prefer oxygen in the form of metal oxides, because other components may bring emission concerns, e.g. as $SO_2$ or $SO_3$, as CO or $CO_2$, dioxins, etc . . . , and therefore simplify any treatment of the furnace exhaust gasses.

In an embodiment of the process according to the present invention, the feedstock comprises, relative to the total dry weight of the feedstock, more than 2% wt of tin, preferably at least 4% wt, more preferably at least 6% wt, even more preferably at least 8% wt, preferably at least 10% wt, more preferably at least 12% wt, even more preferably at least 14% wt, yet more preferably at least 16% wt of tin, preferably at least 18% wt, more preferably at least 20% wt, even more preferably at least 22% wt, yet more preferably at least 24% wt of tin.

We have found that a higher amount of tin in the feedstock reduces the melting point of the feedstock, with the advantage that the process according to the present invention is operable over a wider temperature range. We have also found that the high purity tin metal which may eventually be recovered from the crude solder obtainable by the process according to the present invention is higher in demand as compared to the high purity lead metal. A higher tin content in the process streams of the present invention thus increases the economic interest in the crude solder obtainable by the process according to the present invention as a further feedstock for recovering tin metal in high purity.

In an embodiment of the process according to the present invention, feedstock comprises, relative to the total dry weight of the feedstock, less than 71% wt of tin, preferably at most 69% wt, more preferably at most 65% wt, even more preferably at most 62% wt, yet more preferably at most 59% wt, preferably at most 56% wt, more preferably at most 53% wt, even more preferably at most 50% wt, yet more preferably less than 50% wt, preferably at most 48% wt, more preferably at most 46% wt, even more preferably at most 45% wt, preferably at most 44% wt, more preferably at most 43% wt, even more preferably at most 42.5% wt, yet more preferably at most 42% wt of tin, preferably at most 41% wt, more preferably at most 40% wt, preferably at most 38% wt, more preferably at most 36% wt, even more preferably at most 34% wt, preferably at most 32% wt, more preferably at most 30% wt, even more preferably at most 28% wt of tin.

We have found that a lower amount of tin in the feedstock improves the downstream separation processes. We have also found that a lower tin content of the feedstock, brings the advantage that the solubility of copper in the feedstock is reduced, which leads to a lower copper content in the ultimate prime products, such as tin and lead, after further downstream processing by for example vacuum distillation, which increases the economic value of these prime products and/or reduces the burden of removing the remaining traces of copper in a further downstream copper removing process step.

In an embodiment of the process according to the present invention, the feedstock comprises, relative to the total dry weight of the feedstock, more than 1.00% wt of copper, preferably at least 1.02% wt, more preferably at least 1.05% wt, preferably at least 1.07% wt, more preferably at least 1.10% wt, even more preferably at least 1.12% wt, yet more preferably at least 1.15% wt of copper, preferably at least 1.17% wt, more preferably at least 1.19% wt, even more preferably at least 1.20% wt, preferably at least 1.30% wt, more preferably at least 1.40% wt, even more preferably at least 1.60% wt, more preferably at least 1.80% wt, even more preferably at least 1.90% wt of copper.

We have found that the amounts of copper, as specified in accordance with the present invention, may be left in the crude solder without destroying the usefulness of the solder after tuning as further feedstock for a vacuum distillation step, hence without significantly reducing or destroying the effect which is obtained by the present invention, i.e.

increasing the risk that a vacuum distillation step performed on the tuned solder, would not anymore be able to operate in continuous mode over an extended period of time without encountering problems of intermetallic compounds comprising copper which impair the distillation operations. We have found that the identified problems may be reduced to a practically and economically acceptable level when the small amounts of copper, as specified, remain present in the crude solder according to the present invention, when used after tuning as the feedstock for a vacuum distillation step to separate off at least a part of the lead in the solder stream.

In an embodiment of the process according to the present invention, the feedstock comprises, relative to the total dry weight of the feedstock, less than 10% wt of copper, preferably at most 9% wt, more preferably at most 8% wt, preferably at most 7% wt, more preferably at most 6% wt, and yet more preferably at most 5.7% wt, preferably at most 5.5% wt, more preferably at most 5% wt, even more preferably at most 4.5% wt, preferably at most 4% wt, more preferably at most 3.5% wt, preferably at most 3% wt, more preferably at most 2.5% wt, even more preferably at most 2% wt of copper.

We have found that the lower the concentration of copper in the feedstock, the lower the risk for the formation of intermetallic compounds when the crude solder obtainable by the process according to the present invention, after tuning is subjected to vacuum distillation. We have further found that the lower the copper presence in the feedstock, the lower the concentration of copper in the product streams from the downstream vacuum distillation. This reduces the burden in the further removal of copper from these streams on their path towards becoming prime products, in particular in terms of chemicals consumption and in terms of amounts of by-products formed.

In an embodiment of the process according to the present invention, the feedstock comprises, relative to the total dry weight of the feedstock, more than 0.02% wt of antimony, preferably at least 0.05% wt, more preferably at least 0.08% wt, preferably at least 0.10% wt, more preferably at least 0.12% wt, even more preferably at least 0.14% wt, yet more preferably at least 0.16% wt of antimony, preferably at least 0.18% wt, more preferably at least 0.20% wt, even more preferably at least 0.22% wt, preferably at least 0.24% wt, more preferably at least 0.26% wt, even more preferably at least 0.28% wt, preferably at least 0.30% wt, more preferably at least 0.32% wt, even more preferably at least 0.34% wt, yet more preferably at least 0.36% wt of antimony.

We have found that the feedstock may contain measurable, and even significant, amounts of antimony, within the specified limits, without this presence of antimony bringing significant impairment to possible downstream vacuum distillation. We have found that this provides extra freedom of operation for the feedstock. Thanks to this allowance of an amount of antimony in the crude solder obtainable by the process according to the present invention, the process according to the present invention is capable of accepting a feedstock in which antimony is present. Antimony may be present in a variety of primary and secondary feedstocks for non-ferrous metals, as well as in many end-of-life materials. Antimony may for instance be present in lead which was used since Roman times for plumbing. These materials may now become available as demolition materials, often in combination with copper for tubing and other purposes, and with tin and lead for the solder connections. Allowing an amount of antimony in the crude solder obtainable by the process according to the present invention, provides the process according to the present invention to accept such mixed end-of-life materials in the feedstock. We have found that significant concentrations of antimony are allowed in the crude solder obtainable by the process according to the present invention without this creating significant difficulties for the downstream processes.

In an embodiment of the process according to the present invention, the feedstock comprises, relative to the total dry weight of the feedstock, less than 5% wt of antimony, preferably at most 4% wt, more preferably at most 3% wt, even more preferably at most 2% wt, yet more preferably at most 1.5% wt, preferably at most 1.00 wt % of antimony, more preferably at most 0.95% wt, even more preferably at most 0.9% wt, preferably at most 0.87% wt, more preferably at most 0.85% wt, even more preferably at most 0.8% wt, yet more preferably at most 0.75% wt, preferably at most 0.7% wt, more preferably at most 0.65% wt, even more preferably at most 0.6% wt, preferably at most 0.5% wt, more preferably at most 0.4% wt, even more preferably at most 0.35% wt of antimony.

We have found that antimony may be allowed in the feedstock, within specific limits, without creating problems when the crude solder obtainable by the process according to the present invention is tuned and used as feedstock for downstream vacuum distillation. We have found that it is important to keep the amount of antimony below the specified upper limit because antimony may also at least partially evaporate under the distillation conditions. If the level of antimony is higher, the amount of antimony leaving the distillation step with the high lead containing overhead product may become significant. In order to obtain the higher purity prime lead product complying with the desired industry standards, this amount of antimony needs to be removed from this lead stream in the conventional clean-up steps downstream of the distillation step. An amount of antimony above the specified limit increases the burden of these downstream clean-up steps and increases the amount of by-product streams containing the antimony. Because these by-product streams may also contain significant amounts of lead, this lead in the by-products is not ending up in the prime lead product and at least reduces the effectiveness of the overall operation.

In an embodiment of the process according to the present invention, the feedstock comprises, relative to the total dry weight of the feedstock, more than 0.0004% wt of bismuth, preferably at least 0.0005% wt, more preferably at least 0.0006% wt, preferably at least 0.0007% wt, more preferably at least 0.0008% wt, even more preferably at least 0.0009% wt, yet even more preferably at least 0.0010% wt of bismuth, preferably at least 0.002% wt, preferably at least 0.003% wt, more preferably at least 0.004% wt, even more preferably at least 0.005% wt, preferably at least 0.0075% wt, more preferably at least 0.01% wt, even more preferably at least 0.0125% wt, yet even more preferably at least 0.015% wt, preferably at least 0.020% wt of bismuth.

In an embodiment of the process according to the present invention, the feedstock comprises, relative to the total dry weight of the feedstock, less than 1.0% wt of bismuth, preferably at most 0.8% wt, preferably at most 0.6% wt, more preferably at most 0.4% wt, even more preferably at most 0.2% wt, and yet even more preferably at most 0.1% wt of bismuth, preferably at most 0.08% wt, more preferably at most 0.06% wt, even more preferably at most 0.05% wt, preferably at most 0.04% wt, more preferably at most 0.03% wt, even more preferably at most 0.025% wt of bismuth.

We have found that bismuth may be allowed in the feedstock, within specific limits. We have found that bismuth may be relatively volatile under the conditions of the vacuum distillation step. Some of the bismuth may therefore find its way into the prime products, from which it may then need to be removed in order to obtain a prime product that complies with the desired product specifications. This downstream contaminant removal consumes chemicals and creates a by-product stream which contains also some valuable prime product. Even if successfully recycled, these by-product streams represent a process inefficiency which is advantageously reduced. Therefore it is more advantageous to limit the amount of bismuth in the feedstock.

We have further found that the risk for the formation of potentially disturbing intermetallic compounds is reduced by controlling the presence of the above mentioned compounds, tin, copper, antimony and bismuth, in the feedstock between the mentioned levels.

In an embodiment of the process according to the present invention, the feedstock comprises, relative to the total dry weight of the feedstock, less than 1.0 wt % of arsenic, preferably at most 0.8% wt, more preferably at most 0.6% wt, preferably at most 0.4% wt, more preferably at most 0.3% wt, even more preferably at most 0.20% wt, and yet even more preferably at most 0.185% wt of arsenic, preferably at most 0.18% wt, more preferably at most 0.175% wt, even more preferably at most 0.170% wt, preferably at most 0.15% wt, more preferably at most 0.13% wt, even more preferably at most 0.11% wt of arsenic.

We prefer to keep the amounts of arsenic in the feedstock within limits. This reduces the burden of removing arsenic downstream from any of the product streams from a possible vacuum distillation step. These downstream removal steps use chemicals and generate by-product streams which inevitably contain also some amounts of valuable metals such as lead and/or tin. Even if successfully recycled, these by-product streams represent an overall process inefficiency, and it is advantageous to reduce their volume. Recycling may also bring problems caused by the chemicals in these by-product streams, such as a corrosive effect on refractory materials used in the equipment and in contact with the hot liquid streams.

In an embodiment of the process according to the present invention, the feedstock comprises, relative to the total dry weight of the feedstock less than 2.0 wt % of nickel, preferably at most 1.7% wt, more preferably at most 1.5% wt, even more preferably at most 1.2% wt, yet even more preferably at most 1.0% wt, preferably at most 0.8% wt, more preferably at most 0.6% wt, preferably at most 0.50% wt, more preferably at most 0.45% wt, even more preferably at most 0.40% wt, and yet more preferably at most 0.35% wt of nickel, preferably at most 0.30% wt, more preferably at most 0.29% wt, even more preferably at most 0.28% wt, preferably at most 0.26% wt, more preferably at most 0.24% wt, even more preferably at most 0.22% wt, preferably at most 0.20% wt, more preferably at most 0.18% wt, even more preferably at most 0.16% wt, preferably at most 0.14% wt, more preferably at most 0.12% wt of nickel.

We have found that the risk for the formation of potentially disturbing intermetallic compounds is reduced by controlling the presence of the above mentioned compounds, arsenic and nickel, in the feedstock below lower levels. Nickel is a metal which is present in many raw materials available for the recovery of non-ferrous metals, in particular in secondary raw materials, and especially in end-of-life materials. It is thus important in the recovery of non-ferrous metals that the process is capable of coping with the presence of nickel. Furthermore, the pyrometallurgical processes for recovering non-ferrous metals often consume significant amounts of iron as a process chemical. It is advantageous to be able to use secondary iron-containing materials for this purpose. These materials may, besides high amounts of iron, also contain minor amounts of nickel. It is advantageous to be able to also cope with a certain amount of these kinds of process chemicals. We have further found that it is preferred to bring down the nickel content in the feedstock to the process according to the present invention, rather than removing larger amounts of nickel downstream. Such downstream nickel removal is typically performed together with removing arsenic (As) and/or antimony (Sb), and carry a risk for generating the very toxic gasses arsine ($AsH_3$) and/or stibine ($SbH_3$). The nickel removal down to within the specified limits therefore also reduces the downstream risk for the generation of toxic gasses, and is thus also a safety and industrial hygiene measure.

In an embodiment of the process according to the present invention, the feedstock comprises, relative to the total dry weight of the feedstock, at least 8% wt of lead, preferably at least 10% wt, more preferably at least 15% wt, even more preferably at least 20% wt, preferably at least 22% wt, more preferably at least 24% wt, even more preferably at least 26% wt, yet more preferably at least 30% wt of lead, preferably at least 33% wt, more preferably at least 36% wt, even more preferably at least 40% wt of lead.

In an embodiment of the process according to the present invention, the feedstock comprises, relative to the total dry weight of the feedstock at most 80% wt of lead, preferably less than 79% wt, more preferably at most 75% wt, even more preferably at most 70% wt, yet more preferably at most 69% wt, and yet even more preferably at most 68% wt of lead, preferably at most 65% wt, more preferably at most 60% wt, preferably at most 55% wt, more preferably at most 50% wt, even more preferably at most 45% wt, preferably at most 42% wt, more preferably at most 41% wt, preferably at most 40% wt, more preferably at most 35% wt, even more preferably at most 30% wt of lead. The applicants prefer to operate with the lead content within the prescribed limits, because on the one hand it offers the advantage of a high density solder which facilitates separation by gravity of the molten solder from the slag phase, and on the other hand it leaves significant room for tin metal, which is substantially more valuable than lead, which is beneficial for the economic value added of the process according to the present invention.

In an embodiment of the process according to the present invention, the feedstock is characterized by a lead/tin (Pb/Sn) weight ratio of more than 0.50, preferably at least 0.52, more preferably at least 0.53, preferably at least 0.54, more preferably at least 0.55, even more preferably at least 0.56, yet more preferably at least 0.57, preferably at least 0.60, more preferably at least 0.65, even more preferably at least 0.70, preferably at least 0.80, more preferably at least 0.90.

In an embodiment of the process according to the present invention, the feedstock is characterized by a lead/tin ratio which is less than 4.0, preferably at most 3.5, more preferably at most 3.2, even more preferably at most 3.1, preferably at most 3.0, more preferably at most 2.9, and yet more preferably at most 2.8, preferably at most 2.5, more preferably at most 2.2, even more preferably at most 2.0, preferably at most 1.8, more preferably at most 1.6.

The inventors have found that the remaining slag comprises lower amounts of valuable tin when the lead/tin ratio is between the mentioned levels. When the lead/tin ratio of the feedstock is too low, i.e. below 0.5, more lead containing materials are preferably added to the feedstock until a ratio of at least 0.5 is obtained. The inventors have found, when the feedstock comprises more lead, that the relative amount of tin in the crude solder relative to the amount of tin in the feedstock, is also higher. The inventors have found, by offering more lead together with the tin, that the recovery of tin in the process is improved, and less of the available tin is ending up in the slag. The inventors have found that having the lead/tin ratio within the prescribed limits improves the various separation steps in the overall process that operate on the basis of gravity.

As detailed above, the process according to the present invention comprises the step a) and/or step j) of building a liquid bath of a metal phase and/or a slag in a furnace by heating and melting at least a part of the feedstock which feedstock is preferably retained by a sieve with a sieve opening equal to or smaller than 3.0 mm.

In an embodiment of the process according to the present invention, step a) and/or step j) further comprises the addition of lead into the furnace, preferably in the form of lead metal, lead scrap or lead compounds, preferably lead oxides.

The inventors have found that the addition of lead dilutes the Sn in both the metal phase as well as in the slag, whereby the recovery of the Sn, available in the furnace, into crude solder is improved. The inventors have further found that the downstream processing of the crude solder is improved by a higher Pb presence.

The furnace as used in step a) and/or step j) of the process according to the present invention may be any furnace known in the art of pyrometallurgy such as an Isasmelt furnace, an Ausmelt furnace, a top-blown rotary converter (TBRC) or a smelter.

In an embodiment, the furnace as used in step a) and/or step j) of the process according to the present invention, is a smelter.

In a smelting furnace the metals are molten, and organics and other combustible materials are burned off. The smelter is therefore able to accommodate much more low quality raw materials, which are usually more abundantly available at economically more attractive conditions.

The process according to the present invention, performed in a smelter, may thus accept raw materials that alternate processes known in the art may not accept, or only accept in very limited quantities, and which may thus be more readily available at economically more attractive conditions.

The applicants have found that a smelter step is highly suitable, and even preferable, for performing the process according to the present invention. A smelter step offers the advantage of being simple in operation and in equipment, hence economically advantageous. A smelter step brings the further advantage of being tolerant in terms of raw material quality. A smelter step is able to accept raw materials that are highly diluted and/or contaminated with a wide variety of components, including organic materials, rubbers, plastics, paint, wood, and the like. Because these mixed and/or contaminated raw materials have hardly any other end-use, they may be supplied at economically very attractive conditions. The capability of processing these raw materials and upgrading the valuable metals contained therein, is therefore of interest to the operator of the process according to the present invention.

The inventors have found that the process according to the present invention is preferably carried out in a smelter because the process according to the present invention is then capable of easily accepting feedstocks in finely divided form without any operational problems. A further advantage of using a smelter is that a smelter is a fairly simple and inexpensive apparatus, typically consisting of a large cylinder-shaped furnace which only needs to be able to tilt around its axis over a part of a full circle.

In an embodiment of the process according to the present invention, the part or portion of the feedstock used in step a) and/or step j) comprises divided solid material and comprises at most 5% wt of particles which pass through a sieve having a sieve opening of 2.0 mm, also known as a Mesh 9 sieve, preferably less than 5% wt, more preferably at most 4% wt, even more preferably at most 3% wt, yet more preferably at most 2% wt and yet even more preferably at most 1.0% wt.

In an embodiment of the process according to the present invention, the part of the feedstock used in step a) and/or step j) comprises at most 5% wt of particles which pass through a sieve having a sieve opening of 2.38 mm, also known as a Mesh 8 sieve, preferably a sieve opening of 2.83 mm, also known as a Mesh 7 sieve, more preferably a sieve opening of 3.36 mm, also known as a Mesh 6 sieve, and preferably less than 5% wt, more preferably at most 4% wt, even more preferably at most 3% wt, yet more preferably at most 2% wt and yet even more preferably at most 1% wt.

We have observed that many of the secondary feedstocks for non-ferrous metal recovery are primarily available in a finely divided form, or contain significant portions of small particles.

The inventors have found that it is advantageous to restrict the part of the feedstock which is used in step a) and/or step j) in terms of its content of finely divided material. This may for instance be achieved by sieving at least a portion of the feedstock before this is used in step a) and/or step j), and only using the part that is retained by the sieve as specified. Another suitable possibility is to keep the raw materials that are rich in finely divided material separate from raw materials that have low or no finely divided material content, and use only the latter for introduction into step a) and/or step j) of the process according to the present invention.

The advantage of this feature is that thereby the risk is reduced that many of the small particles in the feed would be blown out of the furnace in which the liquid bath of molten metal is built as part of step a) and/or step j), and therefore would not end up as part of the liquid bath. In particular when the feedstock is heated and/or melted by the combustion of a liquid or gaseous fuel with air and/or oxygen, the step a) and/or step j) may be characterised by a large volume of exhaust gasses, and the gas velocities inside the furnace and in the flue gas exhaust duct may be high. Gas at high velocity is able to readily carry along small solid particles, and the smaller the easier these are carried along. Solid particles being entrained with the furnace exhaust gasses do not anymore participate in the process step. They create an extra burden on the exhaust gas treatment equipment, because they need to be removed before the exhaust gasses may be released to the atmosphere. When recovered, these solid particles or dust preferably need to be reprocessed, rather than being disposed of as waste.

The inventors have found that by increasing the mesh size or sieve openings of the sieves which are to retain the feedstock for step a) and/or step j), brings the benefit that step a) and/or step j) may be operated with higher gas velocities without increasing the risk for dust entrainment from the furnace into the exhaust gasses. Higher gas velocities means that the energy input into the furnace may be increased, and that the building of the liquid bath in step a) and/or step j) may be less time consuming.

In an embodiment of the process according to the present invention, the pieces used as the feedstock have at least two dimensions that are smaller than 0.5 m. This brings the advantage that all the pieces may readily pass a typical feeding opening of a furnace for operating the process of the present invention, which is a square of 0.5×0.5 m size.

The inventors have found that using a feedstock which is retained by a sieve with a prescribed sieve opening, also avoids possible industrial hygiene issues associated with feedstock dust in the working environment and atmosphere.

Many of the feedstocks comprising valuable Sn and/or Pb are available in a finely divided form. For example, exhaust dust collected in off-gas dust filter units or the output of drying units where the oxidic metal raw materials are mixed, dried and sieved, often contain significant amounts of Sn and/or Pb. The finely divided feedstocks are preferably not fed into step a) and/or step j) of the process according to the present invention, because of the reasons mentioned above. The inventors have however found that the process according to the present invention is capable of accepting finely divided feedstocks without operational problems, such as when the finely divided feedstocks are injected into the liquid bath which is present in the furnace during operation, preferably when a suitably and sufficiently large amount of liquid bath is present, more preferably the liquid bath comprising a layer of liquid slag, such as when a liquid bath has been built from the larger size feedstock material that is preferred for step a) and/or step j).

In a further embodiment, the process according to the present invention further comprises the step of injecting, into the liquid bath that has been formed in step a) and/or step j), a finely divided portion of the feedstock, the finely divided feedstock portion having an average particle size of at most 10 mm, preferably at most 8 mm, more preferably at most 6 mm, even more preferably at most 5 mm, yet more preferably at most 4 mm, preferably at most 3 mm, more preferably an average particle size that is smaller than the sieve opening prescribed in the characterization of the portion of the preferred feedstock for step a) and/or step j). The finely divided feedstock portion may be injected into the molten metal phase, if present, and/or into the molten metal oxide slag phase, if present. Preferred is to inject the finely divided feedstock portion below the liquid level of the liquid bath formed in the furnace after step a) and/or step j), such that the risk for entrainment of the small particles with the exhaust gas stream from the furnace is reduced. This brings the advantage that the process is capable of coping with feedstock materials that are available in a finely divided form. There are many sources of suitable finely divided feedstock materials. Because these are less acceptable in alternative applications, the capability of the process to cope with these feedstock materials represents a higher economic upgrade.

In an embodiment, the finely divided feedstock portion is injected into the liquid slag phase and above the metal phase of the liquid bath. This brings the advantage that the material is readily incorporated into the liquid bath, quickly melts and reacts to form the desired reduced metal and oxidized metal components, which may then readily find their ways into the respective liquid phases according to their densities. This feature brings the extra advantage that the injection of the finely divided feedstock portion brings only a low extra disturbance of the formation of the two phases in the liquid bath, i.e. the lower phase of molten metal and the upper phase of liquid slag.

The inventors have found that injecting the finely divided feedstock portion or material into the liquid slag phase increases the absorption of the finely divided feedstock particles into the slag by increasing the residence time thereof in the liquid phase. The inventors have further found that preferably a suitably and sufficiently large amount of slag is made to be present before the finely divided feedstock is injected. The applicants prefer to inject the finely divided feedstock portion or material into the bath only when a continuous supernatant slag phase is present in the liquid bath. This brings the advantage that the risk is strongly reduced that a significant part of the finely divided feedstock portion would not be retained in the liquid bath, and leave the furnace with the exhaust gasses. Typically, a suitable amount of slag phase for a convenient injection of finely divided feedstock material is 0.6 ton, preferably 0.65 ton, more preferably 0.7 ton, per ton of metal in the liquid bath.

In an embodiment of the process according to the present invention, the finely divided feedstock portion material has an average particle size of at most 3.36 mm, preferably at most 2.83 mm, more preferably at most 2.38 mm, even more preferably at most 2.00 mm, yet even more preferably at most 1.68 mm, preferably at most 1.50 mm, more preferably at most 1.30 mm, even more preferably at most 1.20 mm, yet more preferably at most 1.10 mm, yet even more preferably at most 1.00 mm. The applicants have found that the smaller the finely divided feedstock particles, the fewer the possible alternative dispositions for this material, and hence the higher the possible upgrade that may be brought by the process according to the present invention. The applicants have further found that the smaller the finely divided feedstock particles the more reactive these particles are, and faster the same amount of feedstock may be processed in the process according to the present invention.

The injection of the finely divided feedstock portion may be performed by suitable injection techniques known to those skilled in the art, for example by injection with the aid of pressurized air.

In an embodiment, the liquid bath of molten metal that is obtained in step a) and/or step j) of the process according to the present invention is kept at a temperature of at least 975° C., preferably at least 1000° C., more preferably at least 1050° C., even more preferably at least 1075° C., yet even more preferably at least 1100° C., more preferably at least 1125° C., even more preferably at least 1150° C. The applicants have found that this lower limit as specified brings the advantage that the slag in the furnace remains fluid and with a viscosity that readily allows the pouring of the slag from the furnace without significant entrainment of portions of the underlying molten metal phase.

In an embodiment, the liquid bath of molten metal that is obtained in step a) and/or step j) of the process according to the present invention is kept at a temperature of at most 1360° C., preferably at most 1340° C., more preferably at most 1320° C., even more preferably at most 1300° C., yet more preferably at most 1280° C., preferably at most 1240° C., even more preferably at most 1220° C. The applicants have found that the upper limit as specified brings the advantage of reduced wear and/or damage to the furnace equipment that is in contact with the hot liquid bath.

As detailed above, the process according to the present invention comprises the step b) and/or step k) in which at least one reducing agent is introduced into the liquid bath to reduce at least a part of the oxidized valence form of tin and/or lead into tin and/or lead metal respectively. As stated elsewhere, the oxidized valence form of tin and/or lead is preferably tin and/or lead oxide.

In a preferred embodiment, the at least one reducing agent is a metallic material comprising at most 25% wt of copper.

Preferred reducing agents for step b) and/or step k) are low Cu-containing metallic materials. In the context of the present invention, the term "low Cu-containing metallic materials" means metallic materials that are containing less than 25% wt of copper, preferably Sn and SnZn metallic materials containing less than 25% wt of copper.

The term "metallic materials" means materials of which the total metal content, relative to the total dry weight of the material, is prescribed in an identical manner as the total metal content of the feedstock of the process according to the present invention.

The reducing agent used in step b) and/or step k) of the process according to the present invention is added to reduce possible Sn and/or Pb oxides into their metals and is typically selected from carbon, metals less noble than Sn and Pb, and secondary feedstocks rich in elemental Fe, Al and/or Si, preferably secondary feedstocks rich in Fe, Al and/or Si metal. Typically any silicon metal present in the preferred reducing agent is secondary in amount or incidental, because materials rich in silicon metal are rather scarce and may readily find an alternative and higher value disposition as compared to its use as a reducing agent in the process according to the present invention.

We have found, with feedstocks containing oxidised metal components such as Cu, Sn, Pb and/or Ni oxides, that many of these metal oxide components may readily be reduced to liberate their respective free metal forms by introducing into the furnace other, and preferably secondary, feedstocks that are rich in elemental Fe, Al and/or Si, such as ferrosilicon (FeSi). Such Fe, Al and/or Si metals are allowed to be contaminated with additional Cu or Sn, and may thus be streams having a limited number of disposal options, such as some of the waste streams from silicon manufacturing for electronic end-uses. The Fe, Al and/or Si metal is able to react with the oxides of the more noble elements Cu, Sn, Pb, Ni. As a result of this reaction, the less noble metals Fe, Al, Si will be oxidised, their oxides will have a tendency to become part of the slag, and be readily separable from the bath of reduced metals.

We have further found that the added reducing agent, which is usually solid, typically floats at the interface between the liquid metal phase and the slag, exactly in the reaction zone where it may perform optimally as a reducing agent. These oxidation/reduction reactions may generate sufficient heat to melt the additional feed and to maintain the temperature in the furnace. The inventors have found that elemental Al and Si provide significantly more energy than Fe, but in excessively high concentrations Al and Si may increase the viscosity of the slag. The inventors have further found that the total amount and the overall composition of the added reducing agent is preferably adjusted in correspondence to the amount of target metals present in the bath in the form of their oxides and which should be reduced, and also preferably that the addition is performed gradually and/or intermittently, in such a way that the reaction continues in a controlled way in order to maintain a steady operation.

In one embodiment of the process according to the present invention, the at least one reducing agent comprises secondary feedstocks rich in Fe, such as containing at least 20% wt of Fe, preferably at least 30% wt Fe, more preferably at least 40% wt Fe, even more preferably at least 45% wt Fe. Preferably these secondary feedstocks are not only rich in Fe but further contain some Sn, such as at least 3% Sn, preferably at least 5% wt of Sn, more preferably at least 10% wt Sn, and in addition are fairly low in Cu, such as at most 5% wt Cu, preferably at most 3% wt Cu, even more preferably at most 1.5% wt of Cu. Suitable reducing agents in this category may for instance be FeSn granulates, available in various purity grades, and which are often referred to as "hardhead", a term which is quite commonly used in the metallurgical field.

Conventionally, carbon has often been used as the reducing agent. However, the inventors have found that carbon may form a foamy slag which may cause the furnace to overflow. In addition, the $CO_2$ which is generated in the reduction reaction, and which is escaping as a hot gas from the furnace, represents a significant heat loss. The inventors have further found that in the process according to the present invention, the reduction reaction of Sn and/or Pb from their oxides into metals, as a result of the addition of a reducing agent in step b) and/or step k), may at least partly be achieved by the introduction of secondary feedstocks rich in Fe, preferably containing some Sn, while being low in Cu, without the formation of a foamy slag or representing a loss of heat. The oxides of the more noble metals in the slag, such as Sn and Pb, are reduced by addition of Fe metal, whereby the Fe metal converts into an oxidized form which moves up into the supernatant slag, and the more noble metals such as Sn and Pb end up into the heavier metal phase underneath. The inventors have further found, to improve the kinetics of the reaction, that the Fe metal feed preferably has a large specific surface. Therefore, fine sheets of scrap metal are preferably used, for instance Fe/Sn waste material such as production waste from the metal can industry. Reject materials from the metal can industry and/or from metal cans after their useful life have little to no other useful disposition and represent a concern for their disposal as landfill.

In an embodiment, the at least one reducing agent comprises metal-containing sand, such as "foundry sand".

The inventors have found that such metal-containing sand or foundry sand is quite suitable as a reducing agent in step b) and/or step k) of the process according to the present invention. Foundry sand is a waste stream of foundries. Clean sand, usually treated with a small amount of organic binder, is used to form a mould, in which then the red-hot and liquid iron or steel is cast. The organic binder substantially burns away during the casting. After cooling, the sand is fairly free-flowing and the cast metal object is readily recovered by removing the sand. Only a part of this sand may be reused because it has become too heavily contaminated with metal during the production process. A significant part therefore has to be discarded. This contaminated sand is called foundry sand. Foundry sand has little to no other useful or valuable disposition and therefore is often landfilled. The discard as landfill represents an environmental burden which is becoming increasingly problematic for the foundry operator. We have found that the foundry sand is an interesting reducing agent in step b) and/or step k) of the process according to the present invention, because of its ready availability from a high number of sources and the lack of high value alternative disposal options.

As detailed above, the process according to the present invention comprises the optional step c) and/or step l) in which is introduced into the furnace at least one energy source comprising at least one metal being less noble than Sn and Pb, and wherein the at least one metal in the energy source is oxidized by the injection of air and/or oxygen into the furnace.

In an embodiment, step c) and/or step l) is present in the process according to the present invention.

The energy source as used in step c) and/or step l) of the process according to the present invention is preferably selected from the group consisting of metals which are less noble than Sn and Pb, in particular selected from elemental Fe, Si, Mg, Zn, Al, Ca and Na, alternatively also called the respective "metal", and combinations thereof.

In an embodiment of the process according to the present invention wherein step c) and/or step l) is present, air and/or oxygen is injected into the liquid bath, typically in the form of enriched air, more preferably as purified oxygen gas.

We have found that a metal less noble than Sn and Pb is able to deliver extra energy by liberating the heat of oxidation while simultaneously reducing Sn and/or Pb oxides to their elemental metal forms. In addition, extra energy may be generated by the injection of a suitable form of oxygen gas into the liquid bath.

The inventors have found that the oxygen gas is preferably injected below the liquid level in the furnace, i.e. directly into the liquid bath. This brings the advantage of a lower risk for losing part of the oxygen in the exhaust gasses, and thus improves the effectiveness of the oxygen gas injection, hence improves the energy efficiency of the process.

The inventors have further found that an oxygen gas injection, optionally in combination or in mixture with natural gas, provides an independent and convenient way for controlling and independently adjusting the total energy input into the furnace by controlling the flow of oxygen. Without the input of oxygen, pure or diluted, all the energy input would have to be delivered by the oxidation of metals added to the furnace. The energy input rate would then not be readily controllable, which represents a risk for temperature runaways. The maintenance of an oxygen gas injection for satisfying part of the energy requirements into the furnace therefore improves the controllability of the energy input rate into the furnace, and reduces the risk for uncontrollable temperature excursions with possibly disastrous consequences.

As detailed above, the process according to the present invention comprises the step d) and/or step m) in which the crude solder is separated from the slag.

It is understood that the separation may be obtained by any suitable method known to the skilled person in the art.

In an embodiment of the process according to the present invention, in step d) and/or step m) the removal from the furnace of the crude solder and/or the slag is performed by tapping the crude solder and/or the slag as a liquid from the furnace.

The inventors have found that when the furnace is a smelter furnace, the crude solder may be tapped during and/or at the end of the batch or campaign by tilting the smelter into one direction, whereby the crude solder is allowed to flow through a tap hole in the smelter wall into a suitable container.

In an embodiment of the process according to the present invention, wherein in step d) and/or step m) the crude solder is tapped as a liquid from the furnace, the process further comprises the step of cooling/solidifying the tapped crude solder by contacting the crude solder with water to obtain crude solder granulates.

The applicants have found that the crude solder in the form of granulates is easier to handle and to transport over long distances, such as when the crude solder is upgraded in a separate apparatus that may be located at a long distance from the point of production.

The inventors have further found, when the furnace is a smelter furnace, that at the end of a production batch the slag may be poured into a pan through the charge opening of the smelter, by tilting the smelter sideways, and subsequently be cooled/solidified in direct contact with water, typically thereby forming granules or a granulate product. The direct contact with water ensures a quick quenching which causes the solder to end up as solder granulates which are easy to handle. We have found that quick quenching is more advantageous compared to slow solidification because it is much faster, requires less plot space and the product is easier to handle. We have further found that it is advantageous to use an amount of water which is sufficient to transport the slag granulates to the granulation pit for settling, and to at least partially recycle the water. The solder granulates may then be removed from the granulation pit by means of a crane or scoop. The solder granulates may be sold or upgraded.

In an embodiment, the process according to the present invention further comprises the step of recovering metal values from the slag from step d) and/or step m). The applicants have found that the slag from step d) and/or step m) contains sufficient amounts of tin and/or lead, and usually also of other valuable metals, such as copper or zinc, to justify the recovery thereof. The slag is also too rich in leachable metals, such that a disposal of landfill of the slag would entail complex precautions in order to avoid possible pollution problems of soil and/or ground water. The recovery of metal values from the slag may be achieved by introducing the slag from step d) and/or step m) in a pyrometallurgical process for the production of a non-ferrous metal, such as copper, zinc or nickel, preferably recovering the tin and/or the lead in the slag into a by-product from the non-ferrous metal production, which by-product may be returned into the process according to the present invention, in step a) or downstream thereof.

The slag from step d) and/or step m) may for instance be recycled during a copper production campaign, preferably in the same furnace, particularly when the slag granulates contain significant amounts of useful metals such as Pb and Sn.

In an embodiment, step d) and/or step m) of the process according to the present invention further comprises, prior to the separation of the slag from the crude solder and to the removal of at least a portion of the slag in step d) and/or step m), the addition to the furnace of an amount of inert solid particulate material, preferably sand (primarily consisting of $SiO_2$) or spent slag on top of the slag, typically as a shielding material.

The inventors have found that the amount of inert solid particulate material, typically sand or spent slag, should be chosen such that it is sufficient for building a solid layer on top of the liquid level at the exit mouth of the furnace, i.e. sufficient to act as a shielding material. The inert solid particulate material is preferably spread on top of the liquid level. The inert solid material is also preferably added only shortly before the slag is removed from the furnace by "pouring" the slag phase. This brings the advantage that less of the solid material has the time and the temperature exposure necessary to melt and to move into the liquid bath, so that more of the solid material remains available for forming the "shield", when the slag is poured, which retains other solid material that may be floating on top of the liquid bath. Readily acceptable particulate materials are materials that do not disturb the slag/metal equilibrium, nor significantly affect the flow characteristics of the slag phase. Most preferably the particulate materials are readily available in abundance and at low cost. Clean sand is quite suitable, and so is a granulated form of a final slag with high melting point, such as a final slag from copper refining. The inventors have further found that the shielding material may form a shell in the furnace mouth which prevents the overflow of solid, unmolten pieces which may be floating on the liquid inside the furnace. Furthermore, sand is a convenient and readily available source of silicon dioxide in suitable purity for achieving the desired result without impairing the process in any way. The silicon dioxide ending up in the slag may readily be recycled to an upstream smelting step, where the silicon dioxide typically ends up in the final spent slag by-product from the smelter, and in which it may bring further benefits. By preference the inert solid particulate material is distributed over a large area of the bath surface, such that it reaches a large portion of the slag floating on top of the crude solder in the liquid bath.

We prefer that the shielding material is in a finely divided form, such as a powder or granulates. The applicants have found that a finely divided form more readily distributes over the surface of the liquid bath.

In an embodiment, step d) and/or step m) of the process according to the present invention further comprises, prior to the separation of the slag and the crude solder, the addition of a flux material comprising $SiO_2$.

A highly suitable flux material containing $SiO_2$ is sand, because it is highly rich in $SiO_2$ and sources of sand that is lean in potentially disturbing other compounds may readily be found. The applicants have however found that suitable alternatives exist, some of which being available at economically even more attractive conditions. The process according to the present invention is capable of handling flux material that contains, apart from $SiO_2$, particular metals, such as Sn, Pb, Cu, Fe, Ni, and/or oxides thereof. These metals, even when introduced as the oxides, may be recovered as part of the overall process, and hence may at least partially be upgraded. The applicants have for instance found that lead glass ("crystal glass") or the waste form thereof, is a very suitable flux material for step d) and/or step m), while this type of waste streams has difficulties finding alternative economic uses. The applicants have found that the cathode-ray-tubes (CRTs) used in older generation television sets, monitors for computers and other electronic equipment, or radar targets, are quite acceptable as a source for suitable flux material, and advantageous because the face of the CRT is typically made up by thick and heavy lead glass, in particular when it was used as part of a consumer product.

The inventors have found that the addition of a flux material causes a reduction in the melting temperature of the slag and/or a reduction of the slag viscosity (and thus increase in fluidity) at a particular temperature. We have found, as an additional benefit, that significant amounts of $SiO_2$ also reduce the $SnO_2$ content of the slag by acidifying the slag and thereby pushing $SnO_2$ out of the slag by affecting the activity of $SnO_2$, which oxide readily reduces to Sn and thus moves into the metal phase.

We have further found that adding $SiO_2$ to the furnace in step d) and/or step m) converts FeO in the slag into FeO—$SiO_2$, according to the following reaction $$2FeO+SiO_2 \rightarrow (FeO)_2 \cdot SiO_2.$$

Preferably sufficient conversion of FeO into $(FeO)_2$—$SiO_2$ is obtained in order to reduce and preferably eliminate the risk for explosions when the slag is removed from the furnace and granulated in contact with water. Under the typical process conditions of slag granulation, FeO is able to act as a catalyst for the decomposition of water into hydrogen and oxygen, whereas $(FeO)_2 \cdot SiO_2$ is inactive for that reaction. The stoichiometric amount of $SiO_2$ necessary to convert all FeO is 1 mole of $SiO_2$ for every 2 moles of FeO, hence 0.42 grams of $SiO_2$ for every 1 gram of FeO. The applicants therefore prefer to use a weight ratio $FeO/SiO_2$ of about 2.4.

In an embodiment, the process according to the present invention comprises at least one of a number of further steps in which the crude solder obtained from step d) and/or step m) is further treated or "tuned" to become a tuned solder that is suitable as a feedstock for vacuum distillation.

The crude solder produced by the process according to the present invention is preferably further tuned for adjusting its composition and subsequently submitted to a distillation step, preferably a vacuum distillation step, wherein lead is removed by evaporation and a stream is remaining that is enriched in Sn. The tuning of the crude solder is preferably performed in the way which is described in great detail in our co-pending European patent application EP-A-16190907.2, filed on 27 Sep. 2016.

The applicants point out that the steps d) and m) of the process according to the present invention, in which the crude solder becomes available, are typically operated at a high temperature, typically much higher than 500° C., rather in the range of 700-1000° C. The applicants point further out that any downstream vacuum distillation for separating lead from the solder, is typically operated at an even higher temperature. The typical temperatures for removing lead from tin by vacuum distillation are at least 900° C., often as high as 1100° C.

In an embodiment, the process according to the present invention further comprises the step e) of cooling the crude solder down to a temperature of at most 825° C. to produce a bath containing a first supernatant dross which by gravity becomes floating upon a first liquid molten tuned solder phase. Preferably the crude solder is cooled down to a temperature of at most 820° C., preferably at most 800° C., more preferably at most 750° C., even more preferably at most 700° C., yet more preferably at most 650° C., preferably at most 600° C., even more preferably at most 550° C., preferably at most 525° C., more preferably at most 500° C., even more preferably at most 450° C., preferably at most 400° C., more preferably at most 370° C., even more preferably at most 360° C., preferably at most 350° C., more preferably at most 345° C., even more preferably at most 330° C., preferably at most 320° C., more preferably at most 310° C.

We have further found that when the cooling trajectory is wider and/or reaches further down in temperature, that more of these metals come out of solution and end up in the supernatant dross. The wider the cooling trajectory is made, the more prone the cooling step becomes for being split into different successive cooling steps, preferably combined with intermediate dross removal. This brings the advantage that overall less dross may need to be removed for removing the same amount of undesired metals, and that the total amount of dross contains less of the target metals of the overall process, which are primarily lead and/or tin, but include also the various precious metals that may be present in the solder and under particular circumstances also the antimony (Sb) which may be present. We have also found that the cooler the crude solder, the higher its density, which is beneficial for the separation by gravity of the dross, because the dross comes more readily floating on top of the denser liquid metal phase.

The applicants therefore submit that step e) of the process according to the present invention is counter-intuitive. The applicants submit that the one of ordinary skill in the art would prefer to keep the solder at the high temperature at which it was produced, possibly even heating it further, before it is submitted to a vacuum distillation step for separating lead from tin.

The applicants have however found that the cooling step e) of the process in accordance with the present invention is able to move, without the intervention of any further chemicals, a significant part of the components in the crude solder which are undesired in the feed for a vacuum distillation step, into a supernatant dross phase, this dross phase thus becoming available for being separated from the liquid solder phase. The applicants have found that this cooling step is a significant contributor in creating a separate dross phase rich in the undesired components, leaving a liquid solder phase which contains less of these undesired components and which hence is more suitable for a vacuum distillation step encountering less operational problems caused by the possible formation of intermetallic compounds during the distillation step. The applicants have found that the cooling step is particularly capable of reducing the content of copper, nickel, iron and/or zinc in the remaining liquid solder phase. We have also found that the cooler the crude solder, the higher its density, which is beneficial for the separation by gravity of the dross, because the dross comes more readily floating on top of the denser liquid solder phase.

In an embodiment, the process according to the present invention further comprises the step g) of adding an alkali metal and/or an earth alkali metal, or a chemical compound comprising an alkali metal and/or an earth alkali metal, to the crude solder separated in step d) and/or step m) or to the first liquid molten tuned solder phase formed in step e) to form a bath containing a second supernatant dross which by gravity comes floating on top of a second liquid molten tuned solder phase. Preferably the step g) is operated downstream of step e), on the first liquid molten tuned solder phase formed in that step e).

The applicants submit that step g) as part of the process in accordance with the present invention reduces the concentration of the undesired metals in the liquid solder phase on its way to the vacuum distillation. This step g) however consumes chemicals, as specified. The applicants submit, by operating step e) and g) in series with respect to the crude solder stream, such that the concentration of undesired metals is even further reduced, that the cooling step e) brings the extra advantage that the then subsequent chemical treatment step g) requires less chemicals.

In an embodiment of the process according to the present invention which includes step g), the process further comprises the step h) of removing the second dross from the second liquid molten tuned solder phase, thereby forming a second tuned solder.

The chemical(s) specified for step g) end up acting as a base, and this base ends up in the dross which may be removed downstream. The dross contains valuable metals, and it is of economic interest to recover these metals from the dross phases separated from the liquid metal phases as part of the process. Many of the known recovery processes for these metals from such dross streams are however of a pyrometallurgical nature. They operate at very high temperatures, so high that most of the construction steel of the equipment which comes in contact with the high temperature process streams, is typically protected with refractory material. The chemical(s) used in step g), and ending up in the dross phase, are however aggressive towards the most typically used refractory materials that are used in the typical pyrometallurgical non-ferrous metal recovery process steps. The applicants submit that the cooling step e) therefore not only contributes in keeping down the level of the chemical(s) introduced in step g), but also contributes to the level of acceptance for reusing the dross separated downstream of step g) in order to recover metal values therefrom by a pyrometallurgical process.

We have found that in the cooling step e) primarily copper, zinc, iron and nickel may chemically bind with tin and that these compounds may come floating on top provided the underlying liquid stream contains sufficient lead, and thus has a sufficiently high density.

We have found that the chemical introduced in step g) is able to bind some of the undesired metals, primarily copper and zinc, and this in a form which also readily comes floating on top as part of the second supernatant dross.

In an embodiment, the process according to the present invention comprises the step f) of removing the first supernatant dross from the first liquid molten tuned solder phase formed in step e), thereby forming a first tuned solder, preferably removing the first supernatant dross before operating step g), if step g) is present.

We prefer to remove the dross from each crude solder treatment step before starting the subsequent treatment step. We have found that this brings the advantage that the overall amount of dross is smaller when compared with the alternative of letting the dross from different steps combine and removing all the dross together at the end of the crude solder treatment steps. A dross contains also some tin and/or lead, and these amounts of valuable metals are thus disadvantageously removed from the metal stream which is fed to the intended downstream vacuum distillation step. These amounts of valuable metals also increase the burden of reworking the dross for recovering the metal values therein, including the entrained tin and/or lead, but also including the other metals removed from the crude solder stream by the treatment.

In an embodiment, the process according to the present invention further comprises the step i) of distilling the first tuned solder from step f) or the second tuned solder from step h), whereby lead (Pb) is removed from the solder by evaporation and a distillation overhead product and a distillation bottom product are obtained, preferably by a vacuum distillation.

The applicants have found that the distillation step i), downstream from, or in some of the embodiments being a part of, the process according to the present invention, is able to operate without any serious risk for the formation of intermetallic compounds inside the distillation equipment.

The distillation step i) may be performed under very low pressures, such as not more than 50 Pa absolute, possibly not more than 10-15 Pa, and often as low as 0.1-5 Pa, in combination with relatively high temperatures of at least 800° C., preferably at least 900° C. The vacuum distillation of the tuned solder may be performed batch-wise, and such batch vacuum distillation techniques have been disclosed in CN101696475, CN104141152, CN101570826, and in Yang et al, "Recycling of metals from waste Sn-based alloys by vacuum separation", Transactions of Nonferrous Metals Society of China, 25 (2015), 1315-1324, Elsevier Science Press. The distillation under vacuum of the tuned solder may also be performed in continuous mode, and such continuous distillation techniques have been disclosed in CN102352443, CN104651626 and CN104593614. Preferably the distillation is performed as disclosed in our co-pending European patent application EP-A-16190907.2, filed on 27 Sep. 2016.

In an embodiment of the process according to the present invention comprising step i), the distillation bottom product of step i) comprises at least 0.6% wt of lead. The applicants prefer that the bottom product comprises more than 0.60% wt of lead, preferably at least 0.65% wt of lead, more preferably at least 0.70% wt of lead, even more preferably at least 0.75% wt of lead, preferably at least 0.80% wt of lead, preferably at least 1.0% wt, more preferably at least 1.5% wt, even more preferably at least 2.0% wt, preferably at least 3.0% wt, more preferably at least 4.0% wt, even more preferably at least 5.0% wt, and yet more preferably at least 6.0% wt of lead.

We believe that higher contents of Pb remaining in the bottom product of the distillation may act as an extra solvent, for instance for the amount of antimony, which may be present in the tuned solder. This solvency effect may be to the benefit of the separation in the distillation step. The prime target of the vacuum distillation step i) is to evaporate lead (Pb) and to produce a lead-containing overhead product which is suitable for being cleaned up further by conventional means to produce a product of high purity lead, so-called "soft-lead". We believe that leaving an amount of lead in the bottom product of the distillation step helps in achieving that goal, by providing a liquid phase which remains attractive for many of the metals other than lead, and hence reducing the desire of these metals to become volatile as well as their tendency to escape from the liquid phase and to end up in the overhead product of the distillation step. We believe that this benefit is enhanced by leaving a higher concentration of lead in the bottom product of the distillation step. We believe this benefit to be particularly important for any antimony which is present in the tuned solder according to the present invention.

We have further found that the problems of the formation of intermetallic compounds during the vacuum distillation of the tuned solder in step i) are further alleviated by leaving a more important presence of lead in the bottom product of the distillation step. We believe that the higher amount of lead has a beneficial impact on keeping the potentially harmful metals better in solution and on reducing their tendency for forming the potentially disturbing intermetallic compounds during the upstream distillation step. Without being bound by theory, we believe that this effect may be based on dilution, but we suspect that there may be additional factors playing a role in reducing the risk for formation of intermetallic compounds under the conditions occurring in the vacuum distillation step.

The bottom product can be further purified in a purifying step, which removes at least part of remaining contaminants such as silver, thereby forming a purified tin stream. For example, by using a technique such as is described in CN102534249, which describes a 4-step crystallizer operation for purifying a crude tin stream by removing silver.

The lead distillate may be further purified in a purifying step, which removes at least part of remaining contaminants such as arsenic and tin, thereby forming a purified lead stream. For example, by using a technique such as drossing.

In an embodiment, the process according to the present invention comprises the step j) of reprocessing the slag from step d) and/or step m) in a pyrometallurgical production run or campaign for producing a copper concentrate.

With "copper concentrate" is meant a metal product comprising at least 50% wt of copper, preferably at least 75% wt of copper.

The reprocessing of the slag from step d) and/or step m) may or may not be operated in the same equipment as the process according to the present invention. The inventors have found that the reprocessing provides a means for the recovery of the Sn and/or Pb which typically has remained in the slag because the slag is in a phase equilibrium with the crude solder at the moment that the two liquid phases are separated from each other as part of step d) and/or step m).

In an embodiment, the process according to the present invention is operated as a campaign, and the campaign is followed in the same equipment by a campaign for producing a copper concentrate or a campaign for the recovery of higher purity copper streams from a copper concentrate, together referred to as "a copper production campaign".

A campaign preferably comprises several consecutive batch runs having a very similar nature. The process according to the present invention is preferably operated in consecutive cycles, whereby, after removing from the furnace at least a portion of the crude solder and/or of the slag, again step a) is performed by introducing again a portion of the feedstock into the furnace and melting the added feedstock portion to again increase the volume of the liquid bath. Subsequently, steps b) and c) and d) may be repeated. Advantageously step b) may be performed at the same time as step a), and the reducing agent may thus be introduced together with the feedstock portion of step a). Also step c), if present, may be performed together with step b), and optionally also together with step a). The same may be performed with respect to the corresponding steps j)-m). When the targeted reactions have sufficiently progressed, the separation in step d) and/or step m) may be allowed to happen, and at least one of the liquid phases may—at least partially—be removed from the furnace, after which again more feedstock may be introduced into the furnace as a repeat of another step a), whereby typically an amount of liquid has remained in the furnace when starting the new step a). At the end of the 2 or 3 final batch runs of a crude solder campaign, the applicants prefer to only tap crude solder and let the slag liquid build up. A crude solder production campaign is then preferably finalised by feeding, melting and reacting materials that are particularly rich in lead, and leaner in tin, as explained elsewhere in this document. In this way, Sn is washed out from the slag phase and/or extracted from the furnace lining, and recovered in the final crude solder from the last batch run. Preferably this "washing" with lead is repeated several times, before the equipment is liberated for another type of operation, such as a copper production campaign.

The process according to the present invention preferably starts with already a significant amount of molten metal in the furnace, as a leftover from a previous run in the same equipment. The leftover metal may for instance be the leftover of a washing step, after a copper production campaign, as explained elsewhere in this document.

The applicants have found that the process according to the present invention is conveniently operated as one or more campaigns in equipment which is also able to produce a copper concentrate containing at least 70% wt and typically 75% wt of Cu, often referred to as black copper, and/or in equipment which may also be able to recover from such a copper concentrate even higher purity copper streams, sometimes referred to as anode-type copper.

A suitable apparatus for operating a combined operation comprising the two different campaigns, is a smelter furnace. A smelter furnace brings the advantage of being relatively simple and usually represents a significantly lower investment cost as compared to more complex alternatives. A suitable apparatus for processing a copper concentrate to recover therefrom an even higher purity copper stream is a top-blown rotary converter (TBRC).

Preferably the slag from step d) and/or step m) is reprocessed in the black copper process or campaign, primarily for the recovery of their Sn and/or Pb content, as well as for the recovery of any copper which may further be present in the slag. The Sn and Pb may be recovered in a slag from the black copper production, and the copper may be recovered as part of the black copper itself. Any Fe and/or $SiO_2$ in the slag from step d) and/or step m) may readily leave the process as part of the end slag from the black copper production.

In an embodiment of the process according to the present invention operated as a campaign and the campaign being followed in the same equipment by a copper production, as part of the transition from the crude solder production campaign to the copper production campaign, the equipment is subjected to at least one washing step. The washing step between the two campaigns has the purpose of reducing the amount of cross-contamination between the two campaigns, preferably reducing the amount of tin (Sn) that is lost for the crude solder production campaign and shows up as a contaminant in the copper production campaign.

The applicants prefer to perform the washing step as follows:

1) at the end of the crude solder campaign as much as possible of the slag and of the crude solder is removed, typically drained as liquid products, from the furnace and relevant ancillary equipment, 2) lead-containing materials, preferably lead-rich materials, are introduced into the furnace, any solids thereof are melted in the furnace, and the liquid furnace content is agitated and brought as much as possible in contact with the furnace inside walls, typically represented by refractory materials, and 3) the molten lead is drained from the furnace and relevant ancillary equipment.

Preferably the washing step is performed two or three times.

The applicants have found that the molten lead-containing material in the furnace is able to extract other metals that may have become adsorbed in the furnace refractory lining. The liquid lead is thus able to clean the furnace, i.e. to remove metals other than Pb that are less desired during a copper production campaign.

When the operations in the furnace are returned from a copper production campaign to a crude solder production campaign, the equipment may also be washed in order to reduce the amount of Cu that may still be present in the equipment—and hence risks to end up in the crude solder—by introducing a second washing step after as much of the copper metal phase as possible is drained. The applicants have found that such a second washing step is less critical and may conveniently be skipped.

Preferably, such a second washing step comprises a dilution of the feed to at least one of the last copper production batches, in order to lower the Cu content of the copper metal phase remaining in the furnace after draining. The thus produced copper metal phase, depending on its composition, may be reprocessed in a suitable other process. Alternatively, the second washing step after a copper production campaign is made similar to the washing step performed after the crude solder production campaign and comprises the feeding of Pb-rich materials, preferably Pb scrap material, after as much as possible of the copper metal phase is drained from the furnace. This addition of lead-rich materials drives more of the remaining Cu present in the furnace into the metal phase before the latter is removed. The metal phase produced from these second washing step, optionally from a sequence of several thereof, comprises Cu, together with Pb and possibly some Sn. This metal phase is tapped and, depending on its composition, is preferably reprocessed in a suitable process for valuable metal recovery.

The inventors have found that the reprocessing of the slag from the crude solder production campaign during the black copper production campaign brings the advantage that any Zn which may be present in the feedstocks of the crude solder production campaign may end up in the slag of the black copper production campaign, and during the black copper campaign may be fumed out from the furnace content. The Zn may thus readily be removed from the overall process and conveniently be recovered as (ZnO) dust from the exhaust gasses. Any Cd present in the feedstocks may also be removed from the overall process in the same way and be collected in the dust phase as cadmium oxide together with the ZnO.

In an embodiment, the process according to the present invention further comprises the addition in step c) and/or step l) of oxides of metals which are more noble than Zn, such as PbO.

The inventors have found by adding metals which are more noble than Zn, that Zn may be converted to its oxide during step c) and/or step l), which zinc oxide is then pushed into the slag. The slag from step d) and/or step m), which is comprising the ZnO, may then be reprocessed in the black copper process or campaign, during which a significant part of the ZnO may be fumed out and recovered. During the fuming, the ZnO is typically first reduced to Zn which evaporates and oxidizes again in contact with the oxidizing furnace atmosphere, forming again ZnO in a particulate form which is then evacuated with the exhaust gasses and may readily be recovered as ZnO dust while the remaining part of the original ZnO in the liquid phase ends up in the slag from the black copper process or campaign. The re-oxidation of the Zn in the furnace atmosphere generates heat, which may partially be used to heat up the refractory lining of the furnace, thereby increasing the temperature of the slag and increasing the removal rate of ZnO for a given concentration in the slag. We have found that the temperature of the slag bath to realize a convenient fuming rate is preferably at least 1200° C. We have however found that the temperature should preferably not exceed 1300° C., in order to reduce the wear of the refractory lining of the furnace.

Inevitably, the metal phase still comprises metals such as Zn and Cd which are considered as being contaminants in the crude solder. Therefore, Zn and Cd are preferably further removed from the metal phase in an efficient way.

In an embodiment, the process according to the present invention further comprises as part of step c) and/or step l) the fuming of Zn out of the metal phase in the furnace and the collection thereof as ZnO dust in the furnace exhaust gas.

Preferably, this ZnO dust as obtained as part of step c) and/or step l) of the process according to the present invention is reprocessed in a subsequent solder composition production run, for the purpose of recovering the Sn present in this ZnO dust. The inventors have found that reprocessing the ZnO dust is more advantageous than selling the dust as such to Zn processing plants, because the dust typically also comprises other contaminants which may be undesirable in the downstream Zn production process. For example, the ZnO dust may comprise halogens, primarily chlorine, which preferably concentrate in this dust. Before being reprocessed in a solder composition production run, at a particular level of halogens, this dust is therefore preferably washed in order to remove halogens, in particular chlorine. Furthermore, we have found that cadmium (Cd) tends to concentrate in this dust, and that it is typically not washed out together with the halogens. When the Cd level in the ZnO dust is higher than what is acceptable in the Zn production process, it is more advantageous to reprocess the ZnO dust by adding the dust to the liquid bath of a black copper process run, such that any Sn (and also Pb) which is present in this leftover ZnO dust may at least be recovered.

The inventors have found that in order to limit the total halogen content in the exhaust gas dust, i.e. the ZnO-containing dust, down to at most 10% wt, relative to the total dry weight of the ZnO-containing dust, the feedstock preferably comprises a limited content of halogens, primarily of Cl, Br, F, more preferably of chlorine (Cl).

In an embodiment of the process according to the present invention, the feedstock to the process comprises at most 2.0% wt of halogens, preferably less than 1.5% wt. The halogens that should be limited as specified is the total of Cl, Br and F together, most preferably the prescribed limit applies to chlorine only.

The inventors have further found that halogens tend to bring other metals than Zn in the exhaust gasses, by forming chlorides that are volatile at the operating conditions, such as $SnCl_2$, and therefore create the risk that significant amounts of valuable metals would be lost into the exhaust gas dust, which at best are reprocessed and thus represent a process inefficiency. Furthermore, we found that halogens also may lead to the formation of sticky, non-permeable, exhaust dust on the fabric of the dust filters and therefore may cause technical problems in the exhaust gas treatment equipment by condensing as liquid phases and subsequent solidification at cooler places.

It is understood that all definitions and preferences, as described above, equally apply for all further embodiments, as described below.

In an embodiment, the process according to the present invention is operated in semi-batch mode and comprises the following steps:

j) introducing, after step d) and/or step m), at least a further portion of the feedstock into the furnace comprising a liquid bath of metal phase and/or molten metal oxide slag, thereby increasing the volume of liquid in the furnace;

k) introducing into the furnace, as a reducing agent, material which contains significant, and preferably effective, amounts of the elemental form of at least one metal which is less noble than Sn and Pb, preferably of elemental Fe, Al and/or Si (alternatively called Fe, Al and/or Si metal), and by oxidation thereof reducing tin and/or lead oxides into their elemental metal form, thereby changing the composition of the metal phase and/or the slag phase in the furnace;

l) optionally introducing into the furnace at least one energy source comprising a combustible material and/or at least one metal which is less noble than Sn and Pb, and oxidizing the combustible material and/or the at least one metal in the energy source by the injection of air and/or oxygen into the furnace;

m) separating the crude solder obtained in step k) and/or l) from the slag and removing from the furnace at least a part of the crude solder and/or of the slag; and n) repeating the process starting from step j) or step a).

The inventors have found that the composition of the slag and/or metal phase in the furnace may be adjusted by the introduction of materials which contain significant amounts of the elemental form of at least one metal which is less noble than Sn and Pb, preferably of elemental Fe, Al and/or Si metal, in order to change the distribution of the different metals that are present in the furnace between the slag phase and the metal phase, which may be affected by the oxidation of the less noble metal to an oxide. The applicants have found that this reaction of the less noble metal also brings energy to the furnace content, energy that thus does not need to be supplied by an energy source and an oxidant, as part of step c) and/or step l).

Although a long list of metals qualify as being less noble than Sn and Pb, the applicants prefer to use Fe, Al and/or Si in step k), because these offer the best balance of availability, reactivity and controllability of the energy supply into the liquid bath.

The applicants add that elemental aluminium (Al) is listed above as a suitable metal to be introduced as part of step k), but that the use of Al in this step does introduce the same safety and industrial hygiene risks, because of the presence of antimony (Sb) and arsenic (As), of somewhere downstream forming the highly toxic gas stibine ($SbH_3$) or arsine ($AsH_3$), as explained above in this document in the context of the "cuprosilicon" process. The use of Al may therefore only be allowed if accompanied with very stringent and complex safety measures downstream of the process according to the present invention. The applicants therefore have found that Al is not the preferred elemental metal to be added as part of step k), and that the preferred metals to be added in step k) are iron and silicon, with the prime advantage of avoiding these safety and industrial hygiene risks.

When the process according to the present invention is performed in semi-batch mode, it means that the furnace is usually not fully emptied over an entire campaign, e.g. during a period as long as 1.5-2 years. The inventors have found that it is advantageous to maintain a minimum amount of liquid bath in the furnace, for example in a typical smelter furnace with a total furnace content of 88 tons, a minimum amount of 55 tons is preferred. The applicants prefer to leave for the subsequent process step a significant amount of liquid volume into the furnace, preferably at least 10% of the available furnace internal furnace volume, more preferably at least 15% volume.

The applicants also prefer that the molten metal phase that is present in the furnace at the start of step a) or of step j) contains at least 1% wt of at least one elemental metal that is less noble than Sn and Pb, preferably at least 2% wt, more preferably at least 3% wt, even more preferably at least 4% wt, yet more preferably at least 5% wt. The applicants prefer that this minimum presence applies to the presence of iron (Fe). This brings the advantage, upon the addition of feedstock containing Sn and/or Pb oxide, that the reduction of these feedstock components into elemental Sn and/or Pb may start immediately upon the addition of the respective oxide. A further advantage is that this redox reaction is exothermic, and thus brings energy into the liquid bath, which is useful for the melting of further added feedstock, which typically is added as a solid, typically rather cold, if not at ambient temperature. The presence of this selected metal, in the elemental form, in the liquid bath at the start of step a) or step j), therefore may bring significant gains in terms of batch time and/or of equipment productivity.

In an embodiment the process in accordance with the present invention comprises the introduction, as part of step c) and/or step l), of a combustible material as an extra energy source. In the presence of sufficient oxygen, this brings the advantage of extra supplies of energy and/or reducing agent into the liquid bath. The further advantage is that the addition of such combustible material may more readily and accurately be controlled, as compared to the addition of the reducing agent as part of step b) or step k) and/or the energy source comprising at least one metal which is less noble than Sn and Pb. A suitable combustible material is for instance wood, coal, any organic liquid, any petroleum or derivative thereof, natural gas, or a mixture of at least two thereof.

In an embodiment, the crude solder according to the present invention comprises, relative to the total weight of the crude solder, comprises more than 9.5% wt of tin, preferably at least 10% wt of tin, more preferably at least 11% wt, even more preferably at least 13% wt, preferably at least 15% wt, more preferably at least 16% wt, preferably at least 17% wt of tin, more preferably at least 18% wt, even more preferably at least 19% wt, preferably at least 20% wt, more preferably at least 25% wt, preferably at least 30% wt, more preferably at least 32% wt, even more preferably at least 34% wt, yet even more preferably at least 36% wt, preferably at least 38% wt more preferably at least 40% wt, even more preferably at least 42% wt of tin.

We have found that a higher amount of tin in the crude solder reduces the melting point of the crude solder, with the advantage that the possible downstream processes may be operable over a wider temperature range. We have also found that the high purity tin metal which may be recovered downstream from the crude solder according to the present invention typically represents a higher economical value than most lead-rich prime products. A higher tin content in the crude solder according to the present invention therefore increases the economic upgrade potential of the composition.

In an embodiment, the crude solder according to the present invention comprises, relative to the total weight of the crude solder, less than 69% wt of tin, preferably at most 68% wt of tin, more preferably at most 65% wt, preferably at most 62% wt, more preferably at most 60% wt, even more preferably at most 58% wt, yet even more preferably at most 57% wt, preferably at most 55% wt, more preferably at most 53% wt, even more preferably at most 51% wt of tin.

In an embodiment, the crude solder according to the present invention comprises, relative to the total weight of the crude solder, more than 25% wt of lead, preferably at least 28% wt of lead, more preferably at least 30% wt, even more preferably at least 32% wt, preferably at least 34% wt, more preferably at least 36% wt, even more preferably at least 37% wt, yet even more preferably at least 38% wt, preferably at least 39% wt, more preferably at least 40% wt, even more preferably at least 41% wt of lead.

We have found that a higher amount of lead in the crude solder improves any separation steps which may be operated downstream of the steps performed in the furnace. We have also found that a higher lead content, thereby typically representing a lower tin content of the crude solder, brings the advantage that the solubility of copper in the crude solder is reduced. A lower copper content of the crude solder allows to more readily obtain a lower copper content in the ultimately recoverable prime products, such as high purity tin and/or lead, for example by vacuum distillation, reducing the burden associated with the downstream removal of the remaining traces of copper. Furthermore, a lower copper content, at least above the minimum levels specified below, decreases the risk of forming intermetallic compounds during the vacuum distillation.

In an embodiment the crude solder according to the present invention comprises, relative to the total weight of the crude solder, less than 90% wt of lead, preferably at most 85% wt, more preferably at most 80% wt, even more preferably at most 75% wt, preferably at most 73% wt, more preferably at most 72% wt, preferably at most 71% wt, more preferably at most 70% wt, even more preferably at most 69% wt, yet even more preferably at most 68% wt, preferably at most 67% wt, more preferably at most 66% wt, even more preferably at most 65% wt, preferably at most 60% wt, more preferably at most 55% wt, even more preferably at most 50% wt, preferably at most 48% wt, more preferably at most 46% wt, even more preferably at most 44% wt of lead.

We have found that increasing the amount of lead in the crude solder above the specified limits does not further significantly enhance the advantages associated elsewhere in this document with a higher amount of lead in the crude solder according to the present invention. We have further found that the higher amounts of lead dilute the typically more valuable tin in the crude solder, thereby reducing the potential economic value of the crude solder.

In an embodiment the crude solder according to the present invention comprises, relative to the total weight of the crude solder, more than 80% wt of tin and lead together, preferably at least 81% wt, more preferably at least 82% wt, preferably at least 83% wt, more preferably at least 84% wt, even more preferably at least 85% wt, yet more preferably at least 86% wt, preferably at least 87% wt, more preferably at least 88% wt, even more preferably at least 89% wt, preferably at least 89.5% wt, more preferably at least 90% wt, even more preferably at least 90.5% wt of tin and lead together. The crude solder comprises preferably at most 96% wt of Sn and Pb together.

The crude solder according to the present invention is of interest as a feedstock for the recovery of high purity tin and/or lead, e.g. by means of a vacuum distillation step as part of the overall process. Prime products, such as tin and lead, desirably should meet as high as possible the international trade standards which are in practice, and therefore non-prime by-products need to be removed from the prime products down to a level which is imposed by the prime product specifications. A higher content of tin and lead together increases the amount of prime products which may be recovered from the crude solder, and reduces the amount of usually lower value by-product streams which may emerge from the further purification steps, e.g. these for purification of the distillation products into prime product streams. This feature also increases process efficiency and reduces the burden associated with the disposal and/or possible recycle of the non-prime by-product streams. This burden comprises chemicals and energy consumption, but also manpower and equipment investment costs. The higher content of tin and lead together thus increases the economic interest in the crude solder according to the present invention as a further feedstock for recovering tin metal in high purity, as well as lead metal in economically acceptable forms.

In an embodiment, the crude solder according to the present invention comprises, relative to the total weight of the crude solder, more than 0.08% wt of copper, preferably at least 0.10% wt, more preferably at least 0.20% wt, even more preferably at least 0.50% wt, yet more preferably at least 0.75% wt, preferably at least 1.00% wt, more preferably at least 1.25% wt, even more preferably at least 1.50% wt, yet even more preferably at least 1.65% wt of copper, preferably at least 1.75% wt of copper, more preferably at least 1.85% wt, preferably at least 1.90% wt, more preferably at least 1.95% wt, even more preferably at least 2.0% wt, yet even more preferably at least 2.1% wt, preferably at least 2.2% wt more preferably at least 2.3% wt, even more preferably at least 2.4% wt, preferably at least 2.5% wt more preferably at least 3% wt, even more preferably at least 3.5% wt, preferably at least 4.0% wt more preferably at least 4.5% wt, even more preferably at least 5.0% wt of copper.

We have found that the above specified amounts of copper may be left in the crude solder according to the present invention without significantly affecting the usefulness of the crude solder after tuning [tuned solder, herein after]. The crude solder after tuning may be used as further feedstock for a vacuum distillation step without significantly reducing or destroying the effect which is obtained by the present invention, i.e. increasing the risk that a vacuum distillation step performed on the tuned solder, would not anymore be able to operate in continuous mode over an extended period of time without encountering problems of intermetallic compounds comprising copper which impair the vacuum distillation operations. We have found that the identified problems may be reduced to a practically and economically acceptable level when the small amounts of copper, as specified, remain present in the crude solder according to the present invention when used after tuning as feedstock to the vacuum distillation step.

In an embodiment the crude solder according to the present invention comprises, relative to the total weight of the crude solder, less than 11% wt of copper, preferably at most 10% wt of copper, preferably at most 9% wt, more preferably at most 8% wt, even more preferably at most 7% wt, yet even more preferably at most 6% wt of copper, preferably at most 5.5% wt, more preferably at most 5% wt, even more preferably at most 4.5% wt of copper.

We have found that the lower the concentration of copper in the crude solder according to the present invention, the lower the risk for the formation of intermetallic compounds when the tuned solder is subjected to vacuum distillation. We have further found that the lower the copper presence in the crude solder according to the present invention, the lower the concentration of copper in the product streams obtained from the downstream vacuum distillation. This reduces the burden associated with the further purification steps by removal of copper from these streams on their path towards becoming prime products, in particular in terms of consumption of chemicals which may be used in these downstream purification steps and in terms of amounts of by-products formed. These by-product streams are preferably recycled to a step upstream of the process in accordance with the present invention and may still comprise the chemicals which may have been used in the purification step. This feature thus also brings an advantage in terms of reducing the potentially damaging effects of these chemicals in this recycle operation, such as by attacking the refractory material in an upstream pyrometallurgical step.

In an embodiment, the metal mixture according to the present invention comprises, relative to the total weight of the crude solder, less than 0.7% wt of zinc, preferably at most 0.69% wt of zinc, more preferably at most 0.68% wt, preferably at most 0.65% wt, more preferably at most 0.63% wt, even more preferably at most 0.60% wt, yet even more preferably at most 0.580% wt, preferably at most 0.570% wt, preferably at most 0.560% wt, preferably at most 0.550% wt, more preferably at most 0.540% wt, preferably at most 0.50% wt, more preferably at most 0.40% wt, even more preferably at most 0.30% wt, yet even more preferably at most 0.20% wt, preferably at most 0.10% wt, more preferably at most 0.08% wt, even more preferably at most 0.06% wt, yet even more preferably at most 0.05% wt of zinc.

We have found that a vacuum distillation which is performed on the crude solder according to the present invention after tuning, i.e. the tuned solder, may be particularly sensitive to the presence of zinc. Zinc is capable of forming intermetallic compounds, and hence may contribute to the problem addressed by the present invention. Zinc is also a rather volatile metal and any zinc present may also at least partially become part of the vapour phase inside the distillation equipment. The heating in the distillation equipment is very often provided electrically, by sending an electric current through heating electrodes inside the distillation equipment. We have found that a control of the presence of zinc within the prescribed limits reduces the risk for electric arcs that may be pulled between two points of these heating electrodes which may be located close to each other and between which there is a voltage difference. Such electric arcs represent a short in the electrical circuit of the heating installation, and are often a cause of immediate equipment shutdown. In case of absence or malfunction of fuses, they may even cause damage to the transformer and AC/DC converter in the electrical system. The electric arcs are damaging and possibly destroying the electrodes, and may in addition also burn through the furnace wall, in particular when drawn between an electrode and the furnace wall.

In an embodiment the crude solder according to the present invention comprises, relative to the total weight of the crude solder, at least 0.0001% wt of zinc, preferably at least 0.0005% wt, more preferably at least 0.0010% wt, even more preferably at least 0.0050% wt, preferably at least 0.010% wt, more preferably at least 0.02% wt, even more preferably at least 0.03% wt of zinc.

We have found that it is not necessary to remove zinc down to levels below the specified limits in order to sufficiently alleviate the problems which zinc may cause during the vacuum distillation of the tuned solder according to the present invention. We have found that small amounts of zinc, as specified, may therefore be left in the crude solder which is used after tuning as feed for a vacuum distillation. We have found, with the zinc content being within the specified limits in the crude solder according to the present invention, that the target low levels of zinc in the prime purified metal end-products may readily be reached.

In an embodiment the crude solder according to the present invention comprises, relative to the total weight of the crude solder, less than 2.80% wt of nickel, preferably at most 2.755% wt of nickel, more preferably at most 2.750% wt, preferably at most 2.745% wt, more preferably at most 2.742% wt, even more preferably at most 2.741% wt, yet even more preferably at most 2.740% wt, preferably at most 2.730% wt, more preferably at most 2.720% wt, even more preferably at most 2.710% wt, preferably at most 2.6% wt, more preferably at most 2.4% wt, even more preferably at most 2.2% wt, preferably at most 2.0% wt, more preferably at most 1.5% wt, even more preferably at most 1.0% wt, preferably at most 0.8% wt, more preferably at most 0.75% wt, even more preferably at most 0.7% wt of nickel.

Nickel is a metal which is present in many raw materials available for the recovery of non-ferrous metals, in particular in secondary raw materials, and especially in end-of-life materials. It is thus important in the recovery of non-ferrous metals that the process is capable of coping with the presence of nickel. Furthermore, the pyrometallurgical processes for recovering non-ferrous metals often consume significant amounts of iron as a process chemical. It is advantageous to be able to also cope with these kinds of process chemicals. It is also advantageous to be able to use secondary iron-containing materials for this purpose. These materials may, besides high amounts of iron, also contain minor but significant amounts of nickel. Nickel is also a metal which may form intermetallic compounds during a downstream vacuum distillation step. We have found that a control within the specified limits of the amount of nickel present in the crude solder according to the present invention is able to suffi-ciently reduce the risk for the formation of nickel-containing intermetallic compounds during vacuum distillation of the tuned solder. We have further found that it is more advan-tageous to bring down the nickel content in the feedstock to the vacuum distillation step, e.g. in the tuned solder, rather than removing larger amounts of nickel further downstream in the process. Such further downstream nickel removal step is typically performed together with removing arsenic (As) and/or antimony (Sb), and carry a risk for generating the very toxic gasses arsine ($AsH_3$) and/or stibine ($SbH_3$). The nickel removal upstream of the vacuum distillation, down to within the above specified limits, therefore also reduces the downstream risk for the generation of toxic gasses, and thus also represents a safety and industrial hygiene measure.

In an embodiment the metal mixture according to the present invention comprises, relative to the total weight of the crude solder, at least 0.0005% wt of nickel, preferably at least 0.0010% wt, more preferably at least 0.0050% wt, preferably at least 0.010% wt, more preferably at least 0.050% wt, preferably at least 0.1% wt, more preferably at least 0.2% wt, preferably at least 0.3% wt, preferably at least 0.4% wt, more preferably at least 0.5% wt, preferably at least 0.55% wt of nickel.

We have found that it is not essential to remove nickel down to levels below the specified lower limits, such as below the detection limit of 0.0001% wt. We have found that a control within the specified limits of the amount of nickel present in the crude solder according to the present invention may sufficiently reduce the risk for the formation of nickel-containing intermetallic compounds during vacuum distil-lation of the tuned solder, as well as maintaining low the safety and industrial hygiene risk associated with possible downstream generation of arsine and/or stibine gas, while avoiding extra efforts in the clean-up of the crude solder in its preparation as feedstock for a vacuum distillation.

In an embodiment the crude solder according to the present invention comprises, relative to the total weight of the crude solder, less than 5% wt of antimony (Sb), prefer-ably at most 4.50% wt, more preferably at most 4.00% wt, preferably at most 3.50% wt, more preferably at most 3.25% wt, preferably at most 3.00% wt, more preferably at most 2.50 wt %, even more preferably at most 2.35% wt, yet even more preferably at most 2.25% wt, preferably at most 2.15% wt, preferably at most 1.95% wt, preferably at most 1.85% wt, more preferably at most 1.75% wt, even more preferably at most 1.65% wt, yet even more preferably at most 1.55% wt of antimony.

We have found that antimony may be allowed in the crude solder according to the present invention, within specific limits, without creating problems when the tuned solder may be used as feedstock for vacuum distillation. We have found that it is important to keep the amount of antimony below the specified upper limit because antimony may also at least partially evaporate under the distillation conditions. If the level of antimony is higher, the amount of antimony leaving the distillation step with the high lead-containing overhead product may become significant. In order to obtain the higher purity prime lead product in compliance with demanding industry standards, this amount of antimony needs to be removed from this lead stream in the conven-tional clean-up steps downstream of the vacuum distillation step. An amount of antimony above the specified limit increases the burden of these downstream clean-up steps and increases the amount of by-product streams containing the antimony. Because these by-product streams may also con-tain significant amounts of lead, this lead in the by-products is not ending up in the prime lead product and at least reduces the effectiveness of the overall operation.

In an embodiment, the crude solder according to the present invention comprises, relative to the total weight of the crude solder, more than 0.15% wt of antimony (Sb), preferably at least 0.20% wt, more preferably at least 0.25% wt, even more preferably at least 0.35% wt, preferably at least 0.45% wt, more preferably at least 0.50% wt, even more preferably at least 0.55% wt, yet more preferably at least 0.60% wt, preferably at least 0.65% wt, more prefer-ably at least 0.70% wt, preferably at least 0.75% wt, more preferably at least 0.80% wt, even more preferably at least 0.9% wt, preferably at least 1.0% wt, more preferably at least 1.1% wt of antimony.

We have found that the crude solder according to the present invention may contain measurable, and even signifi-cant, amounts of antimony, within the specified limits, without this presence of antimony bringing significant impairment to a possible downstream vacuum distillation step to which the tuned solder may be subjected. We have found that this provides extra freedom of operation for the feedstock. Thanks to this allowance of an amount of anti-mony in the crude solder according to the present invention, the process according to the present invention is capable of accepting raw materials in which a significant amount of antimony is present. Antimony may be present in a variety of primary and secondary feedstocks for non-ferrous metals, as well as in many end-of-life materials. Antimony may for instance be present in lead which was used since Roman times for plumbing purposes. Such materials may now become available from the stripping of buildings, often in combination with copper, such as in waste tubing, and with tin and lead in the solder connections. Allowing an amount of antimony in the crude solder according to the present invention, provides the capability for the process according to the present invention to accept such mixed end-of-life materials. We have found that significant concentrations of antimony may be allowed in the crude solder according to the present invention without these creating significant dif-ficulties for the downstream processes.

In an embodiment, the crude solder according to the present invention comprises, relative to the total weight of the crude solder, less than 7.5% wt of iron, preferably at most 7.00% wt of iron, more preferably at most 6.50% wt, preferably at most 6.00% wt, more preferably at most 5.50% wt, even more preferably at most 5.00% wt, yet even more preferably at most 4.50% wt, yet more preferably at most 4.00% wt, preferably at most 3.50% wt, more preferably at most 3.00% wt, even more preferably at most 2.50% wt, yet even more preferably at most 2.00% wt of iron.

Iron is a metal which is present in many raw materials available for the recovery of non-ferrous metals, in particu-lar in secondary raw materials, and especially in end-of-life materials. Iron is also a metal which may be introduced into the process as a reducing agent. Iron is a metal which may form intermetallic compounds during vacuum distillation. We have found that a control, within the specified limits, of the amount of iron present in the crude solder according to the present invention is able to sufficiently reduce the risk for the formation of iron-containing intermetallic compounds during vacuum distillation of the tuned solder.

In an embodiment, the crude solder according to the present invention comprises, relative to the total weight of the crude solder, at least 0.0005% wt of iron, preferably at least 0.0010% wt, more preferably at least 0.0050% wt, even more preferably at least 0.0100% wt, preferably at least 0.0500% wt, more preferably at least 0.1000% wt, even more preferably at least 0.1500% wt, preferably at least 0.2000% wt, more preferably at least 0.5% wt, even more preferably at least 0.8% wt, preferably at least 0.9% wt, more preferably at least 1.0% wt, even more preferably at least 1.1% wt of iron.

We have found that it is not essential to remove iron down to levels below the specified limits, in particular not below the detection limit of 0.0001% wt. We have found that a control within the specified limits of the amount of iron present in the crude solder according to the present invention is able to sufficiently reduce the risk for the formation of iron-containing intermetallic compounds during vacuum distillation of the tuned solder, while avoiding unnecessary extra efforts in the clean-up of the crude solder in its preparation as feed for a vacuum distillation step.

In an embodiment the crude solder according to the present invention comprises, relative to the total weight of the crude solder, less than 1.10% wt of sulphur, preferably at most 1.09% wt of sulphur, more preferably at most 1.08% wt, even more preferably at most 1.07% wt, yet even more preferably at most 1.06% wt, preferably at most 1.05% wt, more preferably at most 1.04% wt, preferably at most 1.00% wt, more preferably at most 0.80% wt, even more preferably at most 0.70% wt, preferably at most 0.60% wt, more preferably at most 0.50% wt, even more preferably at most 0.40% wt of sulphur.

We have found that the presence of sulphur in the crude solder according to the present invention may cause odour problems, and may pose a problem of industrial hygiene, even if the crude solder has been cooled and solidified. These problems may present themselves during the operations and during storage, but may even be more important during maintenance interventions. We therefore prefer to bring the levels of sulphur in the crude solder according to the present invention down to within the specified upper limits.

In an embodiment the crude solder according to the present invention comprises, relative to the total weight of the crude solder, more than 0.010% wt of sulphur, preferably at least 0.020% wt, more preferably at least 0.030% wt, even more preferably at least 0.050% wt, preferably at least 0.100% wt of sulphur.

We have found that it is not required to bring the levels of sulphur down to levels below the specified limits, in particular not below 0.010% wt or 100 ppm wt, in order to achieve the effects which are targeted by the control of the sulphur content.

In an embodiment the crude solder according to the present invention comprises, relative to the total weight of the crude solder, more than 0.012% wt of bismuth, preferably at least 0.015% wt of bismuth, more preferably at least 0.02% wt, preferably at least 0.025% wt, more preferably at least 0.03% wt, preferably at least 0.04% wt, more preferably at least 0.05% wt, even more preferably at least 0.06% wt, yet even more preferably at least 0.07% wt, preferably at least 0.08% wt, more preferably at least 0.09% wt of bismuth.

Optionally the crude solder comprises less than 1.5% wt of bismuth, preferably at most 1.45% wt of bismuth, preferably at most 1.40% wt,more preferably at most 1.35% wt, even more preferably at most 1.30% wt, yet even more preferably at most 1.27% wt, preferably at most 1.24% wt, more preferably at most 1.21% wt, preferably at most 1.1% wt,more preferably at most 1.0% wt, even more preferably at most 0.9% wt, preferably at most 0.8% wt, more preferably at most 0.6% wt, even more preferably at most 0.4% wt, preferably at most 0.2% wt, more preferably at most 0.10% wt of bismuth.

We have found that bismuth may be relatively volatile under the conditions of the vacuum distillation step. Some of the bismuth may therefore find its way into the prime products, from which it may then need to be removed in order to obtain a prime product in compliance with particularly demanding product specifications. This downstream contaminant removal step typically consumes chemicals and creates a by-product stream which also contains some valuable prime product. Even if successfully recycled, these by-product streams represent a process inefficiency which is advantageously reduced.

In an embodiment, the crude solder according to the present invention comprises, relative to the total weight of the crude solder, less than 3% wt of arsenic, preferably at most 2.5% wt of arsenic, more preferably at most 1% wt, preferably at most 0.8% wt, more preferably at most 0.6% wt, even more preferably at most 0.4% wt preferably at most 0.35% wt, more preferably at most 0.3% wt, even more preferably at most 0.25% wt, preferably at most 0.2% wt, more preferably at most 0.18% wt of arsenic.

We prefer to keep the amounts of arsenic within the limits as specified. This reduces the burden for removing arsenic from any of the product streams occurring downstream from a possible vacuum distillation step. These removal steps use chemicals and generate by-product streams which inevitably contain also some amounts of valuable metals, such as lead and/or tin. Even if successfully recycled, these by-product streams represent an overall process inefficiency, and it is advantageous to reduce them. Recycling may also bring problems caused by the other chemicals present in these by-product streams, which may e.g. have a corrosive effect on refractory materials used in the equipment of the process according to the present invention, or upstream or downstream thereof, and which are in contact with hot liquid streams.

In an embodiment, the crude solder according to the present invention comprises, relative to the total weight of the crude solder, at least 0.01% wt of arsenic, preferably at least 0.02% wt, more preferably at least 0.025% wt, preferably at least 0.03% wt, more preferably at least 0.035% wt, even more preferably at least 0.038% wt, yet even more preferably at least 0.04% wt of arsenic.

This feature brings the advantage that feedstock materials that contain some arsenic may be accepted to a certain degree. We have found that the overall process, including the process according to the present invention but also including any downstream steps for further clean-up or upstream steps, is able to cope with the amounts of arsenic as specified. In addition, the inventors have found that some Pb and/or Sn-based alloys of commercial interest readily accept As up to certain levels without any significant problems, and that selected variants of such alloys even welcome the presence of As. The crude solder as well as the process according to the present invention is therefore prepared to accept the presence of As in its process streams, albeit within the specified limits.

In an embodiment, the crude solder according to the present invention comprises, relative to the total weight of the crude solder, less than 0.5% wt of aluminium, preferably at most 0.40% wt of aluminium, more preferably at most 0.30% wt, preferably at most 0.20% wt, more preferably at most 0.10% wt, even more preferably at most 0.05% wt preferably at most 0.04% wt, more preferably at most 0.03% wt, even more preferably at most 0.025% wt, preferably at most 0.02% wt, more preferably at most 0.018% wt of aluminium.

Aluminium is a metal which is present in many raw materials available for the recovery of non-ferrous metals, in particular in secondary raw materials, and especially in end-of-life materials. Aluminium is also a metal which may be introduced into the process as a reducing agent. Aluminium is a metal which may form intermetallic compounds during vacuum distillation. We have found that a control, within the specified limits, of the amount of aluminium present in the crude solder according to the present invention is able to sufficiently reduce the risk for the formation of aluminium-containing intermetallic compounds during vacuum distillation of the tuned solder. A further advantage is, particularly if the crude solder is cooled, solidified, and transported to another location where the solder needs to be remelted into a smelter before being further processed, that, upon introducing oxygen such as in the smelter process, the aluminium readily oxidizes to aluminium oxide, and hence brings significant amounts of energy into the furnace.

In an embodiment, the crude solder according to the present invention comprises, relative to the total weight of the crude solder, at least 0.0010% wt of aluminium, preferably at least 0.0020% wt of aluminium, more preferably at least 0.0030% wt, preferably at least 0.0040% wt, more preferably at least 0.0050% wt, even more preferably at least 0.0060% wt preferably at least 0.0070% wt, more preferably at least 0.0080% wt, even more preferably at least 0.0090% wt, preferably at least 0.010% wt, more preferably at least 0.012% wt of aluminium.

We have found that it is not essential to remove aluminium down to levels below the specified limits, in particular not below the detection limit of 0.0001% wt. We have found that a control within the specified limits of the amount of aluminium present in the crude solder according to the present invention is able to sufficiently reduce the risk for the formation of aluminium-containing intermetallic compounds during vacuum distillation of the tuned solder, while avoiding unnecessary extra efforts in the clean-up of the crude solder in its preparation as feed for a vacuum distillation step.

In an embodiment of the present invention, at least a part of the process is electronically monitored and/or controlled, preferably by a computer program. The applicants have found that the control of steps from the process according to the present invention electronically, preferably by a computer program, brings the advantage of a much better processing, with results that are much more predictable and which are closer to the process targets. For instance on the basis of temperature measurements, if desired also pressure and/or level measurements and/or in combination with the results of chemical analyses of samples taken from process streams and/or analytical results obtained on-line, the control program may control the equipment relating to the supply or removal of electrical energy, supply of heat or of a cooling medium, a flow and/or a pressure control. The applicants have found that such monitoring or control is particularly advantageous with steps that are operated in continuous mode, but that it may also be advantageous with steps that are operated in batch or semi-batch. In addition and preferably, the monitoring results obtained during or after the performance of steps in the process according to the present invention are also of use for the monitoring and/or control of other steps as part of the process according to the present invention, and/or of processes that are applied upstream or downstream of the process according to the present invention, as part of an overall process within which the process according to the present invention is only a part. Preferably the entire overall process is electronically monitored, more preferably by at least one computer program. Preferably the overall process is electronically controlled as much as possible.

The applicants prefer that the computer control also provides that data and instructions are passed on from one computer or computer program to at least one other computer or computer program or module of the same computer program, for the monitoring and/or control of other processes, including but not limited to the processes described in this document.

EXAMPLE

The enclosed FIGURE shows a flow diagram of the process that was operated in this example. The compositions reported in this example are expressed in weight units, and are expressed in accordance with the logic expressed earlier in this document with respect to the expression of elements in their elemental form or in their oxidized form.

For the analysis of the granulated crude solder product, the samples were taken and reduced by quartering. Approximately 10 kg of crude solder granulates was melted in a small furnace. The molten metal was poured into a mould and the solid ingot was milled to obtain small chips. The slag that was formed in equilibrium with the crude solder product was ground in a disc mill and screened on a 200 micron sieve. Representative weights of each obtained fraction were weighed for the different laboratory assays. The final Sn analysis was performed by classical volumetric analysis and copper, lead, zinc, iron, nickel, antimony, bismuth, aluminium, arsenic, manganese, cobalt, molybdenum, sodium, potassium, chrome and cadmium were analysed using an Inductive CouPling Optical Emission Spectrometer (IC-POES), model OPTIMA 5300 V from the Perkin Elmer company, after being dissolved by acid digestion.

In a copper smelter furnace (represented as unit 100 in the FIGURE), at the end of a copper production campaign, was added 1 smelter washing step during which a significant amount of lead scrap was fed to the smelter, melted and brought in intimate contact with as much of the furnace lining as possible, after which a portion of the slag phase and a portion of the metal phase was drained from the furnace. The metal drained from the furnace after this lead washing step was retained as the 1$^{st}$ batch of crude solder production (see Table 2), and was later mixed with the crude solder produced by the subsequent batches of the same campaign. At the end of the smelter washing step was left in the smelter furnace an amount of about 30 metric tons of liquid metal phase comprising about 21% wt Cu, about 36% wt Sn, about 0.4% wt Ni and about 37% wt of Pb. On top of that liquid metal phase was also left a continuous layer of about 10 metric tons of molten slag phase.

For the solder campaign, the materials with the total amounts and global composition as listed in Table 1 were provided. The balance of the compositions, relative to the metal concentrations in the table, were primarily oxygen bound in a metal oxide. The fresh feed part of the feedstock contained small amounts of organic material including carbon, and to a very small extent also bound sulphur. This sulphur content is also given as part of the compositions in Table 1.

The energy source (stream 2 in the FIGURE) contained, apart from the elements shown as part of Table 1, further essentially only Si metal.

TABLE 1

| Feedstock, Energy source and Reducing Agent (wt %) | | | |
|---|---|---|---|
| Element | | Energy source | Reducing |
| % wt | Feedstock | Coarse | Fine | Agent |
| Cu | 1.7444 | 0.0100 | 0.02 | 0.5834 |
| Sn | 29.0506 | 0.0296 | 0.01 | 13.8088 |
| Pb | 21.8877 | 0.0196 | 0.01 | 0.1308 |
| Fe | 2.3440 | 22.8172 | 4.10 | 66.7409 |
| Zn | 2.9035 | 0.2207 | 0.21 | 0.2273 |
| Ni | 0.0291 | 0.0100 | 0.01 | 0.7452 |
| Sb | 0.5882 | 0.0100 | 0.00 | 0.0118 |
| Bi | 0.0429 | 0.0200 | 0.01 | 0.0000 |
| Al | 0.1772 | 0.0000 | 0.03 | 0.0000 |
| As | 0.0779 | 0.0000 | 0.00 | 0.0417 |
| Cd | 0.0143 | 0.0100 | 0.00 | 0.0165 |
| Total metal | 58.8599 | 23.1475 | 4.40 | 82.3064 |
| Pb/Sn ratio | 0.7534 | 0.6622 | 1.00 | 0.0095 |
| S | 0.3802 | 0.0700 | 0.06 | 0.1537 |
| Cl | 0.3765 | 0.0700 | 0.06 | 0.0859 |
| Total mass (kg) | 1687037 | 14146 | 30020 | 182017 |

In the first solder batch, an amount of 13910 kg of the feedstock and about 500 kg of the coarse energy source were gradually introduced into the furnace. The feedstock added at the start of this first solder batch was from the coarse part, and had previously been sieved on a sieve with openings of 3 mm. Only the part that was retained on the sieve was used as the feedstock for this first batch. Also the 500 kg of energy source was the result after sieving over a 3 mm opening sieve.

After a continuous layer of slag had formed in the smelter furnace, gradually 56767 kg of the feedstock and 1709 kg of the fine energy source were added in the slag phase, above the metal liquid level in the furnace. All of these amounts were fine material, having a weight average particle diameter of about 2 mm, and they were gradually injected pneumatically about at the interface level between the metal and the slag phase.

During the batch, a mixture of oxygen and methane was injected into the liquid bath, the mixture having an $O_2/CH_4$ molar ratio of about 2.78. During the batch also, 800 kg of purified sand ($SiO_2$) was gradually added as flux material.

At the end of the batch, 23700 kg of solder (stream 6 in the FIGURE) was tapped from the furnace and granulated to become solder shots. After draining this part of the solder, about 2 metric tons of solid slag originating from a copper production run were added as shielding material, and subsequently, at a temperature of about 1070° C. in the furnace, most of the slag phase was drained (as stream 5 in the FIGURE) from the smelter, granulated as a slag that was later reprocessed as part of a copper production campaign.

At the start of the second solder batch of this campaign, the smelter furnace contained a remaining amount of about 30 metric tons of liquid metal having the same composition as the first solder product (see Table 2), and a small continuous layer of slag on top of the metal.

Spread about equally over the 20 subsequent batches, 868710 kg of the coarse part of the feedstock and 695391 kg of the fine part of the feedstock were added, as well as 11946 kg of the coarse part of the energy source and 28311 kg of the fine part of the energy source. In addition, 182017 kg of the reducing agent (stream 3 in the FIGURE) were added, as appropriate and spread over the batches of the entire campaign. Over the different batches, about 15820 kg of sand was added as flux material, and a total of 927100 kg of solder shots were tapped in total from the smelter furnace. Each time the slag phase was poured, about 2 metric tons of solid slag from a previous copper production campaign was added as shielding material before the pouring of the slag phase. The slags were poured typically at a temperature in the range of 1062-1170° C., granulated and collected for reprocessing during a later copper production campaign.

Throughout the campaign, as appropriate, a mixture of natural gas and oxygen was injected into the smelter furnace. The mixture had an $O_2/CH_4$ molar ratio of about 2.35, with the result that the furnace atmosphere was of an oxidizing nature. The exhaust gasses from the smelter furnace were filtered for collecting the flue dust. This flue dust (stream 4 in the FIGURE), mainly containing zinc oxide, was re-injected into the smelter during the same or the subsequent solder batch or campaign. When the CI or Cd levels in the flue dust had reached their critical limit, the dust collected at that moment onwards during the solder campaign was kept separate and reprocessed gradually during a subsequent copper production campaign.

The compositions and amounts of the solder productions of the first solder batch, of the subsequent 20 intermediate solder batches, of the total crude solder production from the 21 batches together, and of the last washing step are shown in Table 2.

TABLE 2

| Crude Solder Production | | | | |
|---|---|---|---|---|
| Element (wt %) | 1$^{st}$ Batch | 20 further Batches | Sum of 21 Batches | Washing Step |
| Cu | 21.1400 | 4.8361 | 5.2425 | 0.56 |
| Sn | 36.1200 | 53.1433 | 52.7190 | 0.03 |
| Pb | 37.3300 | 38.0800 | 37.0613 | 98.82 |
| Fe | 2.2200 | 1.7297 | 1.7419 | — |
| Zn | 0.7000 | 0.3859 | 0.3938 | 0.02 |
| Ni | 0.3900 | 0.5045 | 0.5017 | 0.09 |
| Sb | 0.7800 | 0.6434 | 0.6468 | 0.06 |
| Bi | 0.2110 | 0.0788 | 0.0821 | 0.043 |
| S | 0.2100 | 0.1167 | 0.1190 | 0.07 |
| Al | 0.0130 | 0.0130 | 0.0130 | — |
| As | 0.2000 | 0.2000 | 0.2000 | — |
| Total % | 99.3140 | 99.7315 | 99.7210 | 99.693 |
| Total Mass (kg) | 23700 | 927100 | 950800 | 17500 |

At the end of each solder production batch, an amount of about 30 tons of metal was left in the furnace, on top of which was also kept a continuous slag layer of about 30 cm thick, representing about 15-20 metric tons of slag.

After the last solder production campaign, all the solder was drained from the smelter, and the smelter was subsequently cleaned in one operation by adding and melting an amount of Pb-rich material, typically lead scrap, followed by intense contacting of the metal phase with the furnace lining, draining and granulating the metal phase. The amount and composition of the metal phase tapped after the washing/cleaning step is also shown in Table 2. The collected metal shots from this washing step were reprocessed during the next solder campaign.

The solder shots produced from the batches of the campaign were transported to a solder processing facility, remelted, and heated up to a temperature of about 835° C. before being further cleaned (i.e. "tuned"). At the time of remelting, sufficient high purity lead was added to the solder such that its Sn/Pb weight ratio in the solder was about 30/70. The tuned solder was further processed by means of vacuum distillation.

In a first cleaning step, the crude solder was cooled down to 334° C., in two steps. In the first step, the crude solder was cooled to about 500° C. and a first dross was removed from the surface of the molten liquid. In the second step, the crude solder was cooled further down to 334° C. and a second dross was removed from the surface of the molten liquid. The total dross contained the majority of the copper present in the crude solder. Also the Fe and Zn content in the solder had been reduced by this first cleaning step. The dross was removed as a by-product and reprocessed during a copper production campaign.

In a second cleaning step, solid sodium hydroxide was added to the solder from the first cleaning step. In this treatment step, zinc was bound by the sodium hydroxide, presumably to form $Na_2ZnO_2$, and forming a separate phase which separated as a supernatant solid from the solder and which was removed. As a result, the zinc content in the solder was further decreased. The amount of sodium hydroxide was adjusted such that the Zn concentration in the solder decreased down to about 15 ppm weight. The dross which was formed in this step was also recycled during a copper production campaign.

In a further cleaning step, downstream of the treatment step which is using sodium hydroxide, an amount of elemental sulphur, representing about 130% of stoichiometry relative to the amount of copper remaining in the solder, was added to further reduce the copper content of the solder. As elemental sulphur was used a granulated form of sulphur obtainable from the company Zaklady Chemiczne Siarkopol in Tarnobrzeg (PL). The sulphur reacted primarily with copper to form copper sulphides which moved into another supernatant dross phase. This dross was removed from the liquid solder. Post this sulphur addition step, in a subsequent step again an amount of sodium hydroxide was added to chemically bind any leftover traces of sulphur to form another dross. After allowing some time for the reaction, a handful of granulated sulphur was scattered/spread over the bath surface. The sulphur ignited and burned any hydrogen which could have evolved from the liquid as a byproduct from the reaction. Subsequently, a small amount of white sand was scattered/spread over the bath in order to dry/stiffen the dross. The total dross formed in this last step was again removed from the liquid metal bath. The thus obtained cleaned solder contained only about 40 ppm wt of Cu and was further processed with vacuum distillation. The sulphur containing dross was reprocessed in a smelter during a copper production campaign, so that its valuable metal content could be valorised.

The cleaned solder was further processed using vacuum distillation, at an average temperature of 982° C. and an average absolute pressure of 0.012 mbar (1.2 Pa). The vacuum distillation step produced two product streams which were suitable for being further purified into high quality prime products according to industry standards. On the one hand we obtained as distillate a product stream which contained mainly lead and on the other hand we obtained as the bottom product a product stream which contained mainly tin, together with about 1.0% wt of Pb. The vacuum distillation was performed in continuous mode, and during a time period of about three (3) years without the observation of any blocking or clogging of the distillation equipment due to the formation of intermetallic compounds. Both product streams of the vacuum distillation step remained during the entire time period suitable for being further refined to form prime products in compliance with established international industry standards.

Having now fully described this invention, it will be appreciated by those skilled in the art that the invention can be performed within a wide range of parameters within what is claimed, without departing from the scope of the invention, as defined by the claims.

The invention claimed is:

1. A process for producing a crude solder having a total dry weight, the crude solder comprising, in addition to unavoidable impurities and relative to the total dry weight of the crude solder:

at least 9.5 wt % and at most 69 wt % of tin (Sn), at least 25 wt % of lead (Pb), at least 80 wt % of tin (Sn) and lead (Pb) together, at least 0.08 wt % and at most 12 wt % of copper (Cu), at least 0.15 wt % and at most 7 wt % of antimony (Sb), at least 0.012 wt % and at most 1.5 wt % of bismuth (Bi), at least 0.010 wt % and at most 1.1 wt % of sulphur(S), at most 0.10 wt % of Cr, Mn, V, Ti or W, at most 3 wt % of arsenic (As), at most 2.8 wt % of nickel (Ni), at most 0.7 wt % of zinc (Zn), at most 7.5 wt % of iron (Fe), at most 0.5 wt % of aluminium (Al), from a feedstock also having a total dry weight, which feedstock comprises at least 50 wt % of total metal, expressed relative to the total dry weight of the feedstock, wherein the total metal in the feedstock comprises the following metals, the amounts of each of these metals being expressed as the total amount of the metal that is present in the feedstock in any oxidized state and in a reduced form, and these total amounts of each metal being expressed relative to the total dry weight of the feedstock:

at least 2 wt % and at most 71 wt % of tin (Sn), at least 1.00 wt % and at most 10 wt % of copper (Cu), at least 0.02 wt % and at most 5 wt % of antimony (Sb), at least 0.0004 wt % and at most 1 wt % of bismuth (Bi), at most 37 wt % of zinc (Zn), at most 0.10 wt % of Cr, Mn, V, Ti or W, at most 1 wt % of arsenic (As), and at most 2 wt % of nickel (Ni);

wherein the feedstock further comprises lead (Pb) at a level of at least 8 wt % and at most 80 wt % and is characterized by a Pb/Sn weight ratio of at least 0.5 and at most 4.0, and wherein at least one of tin (Sn) and lead (Pb) is at least partially present in an oxidized valence form, the process comprising the following steps:

a) obtaining a first liquid bath comprising at least one of a first molten metal phase and a first molten metal oxide slag in a furnace by introducing at least a portion of the feedstock into the furnace and melting the introduced feedstock portion;

b) introducing at least one reducing agent into the furnace and reducing at least part of the oxidized valence form of tin and/or lead into tin and/or lead metal, thereby obtaining a second molten metal phase and a second molten metal oxide slag; and d) separating the second molten metal phase obtained in step b) from the second molten metal oxide slag and removing from the furnace at least a portion of the second molten metal phase as the crude solder of the process, and/or of the second molten metal oxide slag.

2. The process according to claim 1, wherein the feedstock comprises, relative to the total dry weight of the feedstock, at least 51 wt % and at most 100 wt % of metal.

3. The process according to claim 1, wherein the feedstock further comprises substances or components selected from O and S atoms, any of the halogens, carbon, and organic material.

4. The process according to claim 1, wherein the feedstock comprises, relative to the total dry weight of the feedstock, at least 4% wt % and at most 71 wt % of tin.

5. The process according to claim 1, wherein the feedstock comprises, relative to the total dry weight of the feedstock, at least 2 wt % and at most 69 wt % of tin.

6. The process according to claim 1, wherein the feedstock comprises, relative to the total dry weight of the feedstock, at least 1.02 wt % and at most 10 wt % of copper.

7. The process according to claim 1, wherein the feedstock comprises, relative to the total dry weight of the feedstock, at least 1.00 wt % and at most 9 wt % of copper.

8. The process according to claim 1, wherein the feedstock comprises, relative to the total dry weight of the feedstock, at least 0.05 wt % and at most 5% wt of antimony.

9. The process according to claim 1, wherein the feedstock comprises, relative to the total dry weight of the feedstock, at least 0.02 wt % and at most 4 wt % of antimony.

10. The process according to claim 1, wherein the feedstock comprises, relative to the total dry weight of the feedstock, at least 0.0005 wt % and at most 1 wt % of bismuth.

11. The process according to claim 1, wherein the feedstock comprises, relative to the total dry weight of the feedstock, at least 0.0004 wt % and at most 0.8 wt % of bismuth.

12. The process according to claim 1, wherein the feedstock comprises, relative to the total dry weight of the feedstock, at least 0.0000 wt % and at most 0.8 wt % of arsenic.

13. The process according to claim 1, wherein the feedstock comprises, relative to the total dry weight of the feedstock, at least 0.0000 wt % and at most 1.7 wt % of nickel.

14. The process according to claim 1, wherein the feedstock comprises, relative to the total dry weight of the feedstock, at least 10 wt % and at most 80 wt % of lead.

15. The process according to claim 1, wherein the feedstock comprises, relative to the total dry weight of the feedstock, at least 8% wt and less than 79 wt % of lead.

16. The process according to claim 1, wherein the total feedstock is characterized by a Pb/Sn weight ratio of at least 0.52 and at most 3.5.

17. The process according to claim 1, wherein the process is operated in semi-batch mode and further comprises the following steps:

j) introducing, after step d), at least a portion of the feedstock into the furnace which furnace comprises a third liquid bath comprising a third molten metal phase and/or a third molten metal oxide slag, and melting the feedstock portion introduced in step j), thereby increasing the volume of liquid in the furnace;

k) introducing into the furnace as a reducing agent material which contains the elemental form of at least one metal which is less noble than Sn and Pb, and by oxidation thereof reducing tin and/or lead oxides into their elemental metal form, thereby changing the composition of the molten metal phase and/or the molten metal oxide slag in the furnace; and m) separating the molten metal phase obtained in step k) from the molten metal oxide slag and removing from the furnace at least a part of the molten metal phase as the crude solder of the process, and/or of the molten metal oxide slag; and n) repeating the process starting from a step selected from step j) and step a).

18. The process according to claim 1, wherein step a) further comprises the addition of lead into the furnace.

19. The process according to claim 1, wherein the furnace as used in step a) is a smelter.

20. The process according to claim 1, wherein the portion of the feedstock used in step a) comprises divided solid material and the divided solid material comprises at most 5 wt % of particles which pass through a sieve having a sieve opening of 2.0 mm, also known as a Mesh 9 sieve.

21. The process according to claim 1, further comprising as part of step a) the injection, into the liquid bath that has been forming in step a), of a further portion of the feedstock that is a finely divided feedstock portion, the finely divided feedstock portion having an average particle size of at most 10 mm.

22. The process according to claim 1, wherein the liquid bath of molten metal that is obtained in step a) is kept at a temperature of at least 975° C.

23. The process according to claim 1, wherein the liquid bath of molten metal that is obtained in step a) is kept at a temperature of at most 1360° C.

24. The process according to claim 1, wherein the at least one reducing agent as used in step b) comprises at least 0.0000 wt % and at most 25 wt % of copper.

25. The process according to claim 1, wherein the at least one reducing agent as used in step b) comprises a secondary feedstock rich in Fe.

26. The process according to claim 1, wherein the at least one reducing agent as used in step b), further comprises a metal-containing sand.

27. The process according to claim 1, wherein in step d) the removal from the furnace of the crude solder and/or of the second molten metal oxide slag is performed by tapping the crude solder and/or the second molten metal oxide slag as a liquid from the furnace.

28. The process according to claim 1, further comprising the step of recovering metal values from the slag from step d).

29. The process according to claim 1, wherein step d) further comprises, prior to the separation of the slag and the crude solder and to the removal of at least a portion of the slag, the addition to the furnace of an amount of inert solid particulate material.

30. The process according to claim 1, wherein step d) further comprises, prior to the separation of the slag and the crude solder, the addition of a flux material comprising $SiO_2$.

31. The process according to claim 1 in which the slag from step d) is reprocessed in a pyrometallurgical production campaign for producing a metal product comprising at least 50 wt % of copper, also called "a copper concentrate".

32. The process according to claim 1 which is operated as a campaign, and wherein the campaign is followed in the same equipment by a campaign for producing a metal product comprising at least 50 wt % of copper, also called "a copper concentrate", or a campaign for the recovery of higher purity copper streams from a copper concentrate, together referred to as "a copper production campaign".

33. The process according to claim 1, wherein the feedstock comprises at most 2.0 wt % of halogens.

34. The process according to claim 1 for the production of a first tuned solder phase, the process further comprising the step e) of cooling the crude solder down to a temperature of at most 825° C. to produce a bath containing a first supernatant dross which by gravity becomes floating upon a first liquid molten tuned solder phase.

35. The process according to claim 1 further comprising a step c), prior to step d), of introducing into the furnace at least one energy source comprising at least one element selected from the group consisting of a combustible material and at least one metal which is less noble than Sn and Pb, and combinations thereof, and oxidizing the combustible material and/or the at least one metal in the energy source by an injection of at least one compound selected from air and oxygen into the furnace, and whereby the molten metal phase that is obtained in step c) is the molten metal phase that is separated and removed in step d) as the crude solder of the process.

36. The process according to claim 17 further comprising a step l), prior to step m), of introducing into the furnace at least one energy source comprising at least one element selected from the group consisting of a combustible material and at least one metal which is less noble than Sn and Pb, and combinations thereof, and oxidizing the combustible material and/or the at least one metal in the energy source by an injection of at least one compound selected from air and/or oxygen into the furnace, and whereby the molten metal phase that is obtained in step l) is the molten metal phase that is separated and removed in step m) as the crude solder of the process.

37. The process according to claim 17, further comprising as part of step j) the injection, into the liquid bath that has been forming in step j), of a further portion of the feedstock that is a finely divided feedstock portion, the finely divided feedstock portion having an average particle size of at most 10 mm.

38. The process according to claim 17, wherein the liquid bath of molten metal that is obtained in step j) is kept at a temperature of at least 975° C.

39. The process according to claim 17, wherein the liquid bath of molten metal that is obtained in step j) is kept at a temperature of at most 1360° C.

40. The process according to claim 17, wherein the at least one reducing agent as used in step k) comprises at least 0.0000 wt % and at most 25 wt % of copper.

41. The process according to claim 17, wherein the at least one reducing agent as used in step k) comprises a secondary feedstock rich in Fe.

42. The process according to claim 17, wherein the at least one reducing agent as used in step k) further comprises a metal-containing sand.

43. The process according to claim 17, wherein in step m) the removal from the furnace of the crude solder and/or the slag is performed by tapping the crude solder and/or the slag as a liquid from the furnace.

44. The process according to claim 17, further comprising the step of recovering metal values from the slag from step m).

45. The process according to claim 17, wherein step m) further comprises, prior to the separation of the slag and the crude solder and to the removal of at least a portion of the slag, the addition to the furnace of an amount of inert solid particulate material.

46. The process according to claim 17, wherein step m) further comprises, prior to the separation of the slag and the crude solder, the addition of a flux material comprising $SiO_2$.

47. The process according to claim 17 in which the slag from step m) is reprocessed in a pyrometallurgical production campaign for producing a metal product comprising at least 50 wt % of copper, also called "a copper concentrate".

48. The process according to claim 17, further comprising the addition in step l), of oxides of metals which are more noble than Zn.

49. The process according to claim 21, wherein the finely divided feedstock portion is injected into the liquid slag phase and above the metal phase of the liquid bath.

50. The process according to claim 21, wherein the finely divided feedstock portion has an average particle size of at most 3.36 mm.

51. The process according to claim 27, further comprising the step of cooling/solidifying the tapped crude solder by contacting the tapped crude solder with water to obtain crude solder granulates.

52. The process according to claim 32, whereby, as part of the transition from the crude solder production campaign to the copper production campaign, the equipment is subjected to at least one washing step.

53. The process according to claim 34 for the production of a second tuned solder phase, further comprising the step g) of adding a compound selected from the group consisting of an alkali metal and an earth alkali metal, and a chemical compound comprising a metal selected from an alkali metal and an earth alkali metal, to the first liquid molten tuned solder phase to form a bath containing a second supernatant dross which by gravity comes floating on top of a second liquid molten tuned solder phase.

54. The process according to claim 34, further comprising the step f) of removing the first supernatant dross from the first liquid molten tuned solder phase formed in step e), thereby forming a first tuned solder.

55. The process according to claim 53, further comprising the step h) of removing the second supernatant dross from the second liquid molten tuned solder phase, thereby forming a second tuned solder.

56. The process according to claim 55 for further processing the tuned solder, further comprising step j) of distilling the second tuned solder from step h), wherein lead (Pb) is removed from the solder by evaporation and a distillation overhead product and a distillation bottom product are obtained.

57. The process according to claim 54 for further processing the tuned solder, further comprising step i) of distilling the first tuned solder from step f), wherein lead (Pb) is removed from the solder by evaporation and a distillation overhead product and a distillation bottom product are obtained.

58. The process according to claim 35, wherein the energy source of step c) comprises at least one metal which is less noble than Sn and Pb, and the process further comprises an injection of at least one compound selected from air and oxygen into the liquid bath.

59. The process according to claim 35 wherein the at least one energy source is at least one metal which is less noble than Sn and Pb, wherein the process further comprises the step of the introduction, as part of step c), of a combustible material as an extra energy source.

60. The process according to claim 35, further comprising the addition in step c), of oxides of metals which are more noble than Zn.

61. The process according to claim 36, wherein the energy source of step l) comprises at least one metal which is less noble than Sn and Pb, and the process further comprises an injection of at least one compound selected from air and oxygen into the liquid bath.

62. The process according to claim 37, wherein the finely divided feedstock portion is injected into the liquid slag phase and above the metal phase of the liquid bath.

63. The process according to claim 37, wherein the finely divided feedstock portion has an average particle size of at most 3.36 mm.

64. The process according to claim 43, further comprising the step of cooling/solidifying the tapped crude solder by contacting the tapped crude solder with water to obtain crude solder granulates.

65. The process according to claim 48, further comprising as part of step l), the fuming of Zn out from the metal phase in the furnace and the collection thereof as ZnO dust in the furnace exhaust gas.

66. The process according to claim 60, further comprising as part of step c), the fuming of Zn out from the metal phase in the furnace and the collection thereof as ZnO dust in the furnace exhaust gas.

* * * * *